(12) United States Patent
Dunn

(10) Patent No.: US 7,274,365 B1
(45) Date of Patent: Sep. 25, 2007

(54) GRAPHICAL PROCESSING OF OBJECT PERIMETER INFORMATION

(75) Inventor: Sean E. Dunn, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 119 days.

(21) Appl. No.: 10/355,798

(22) Filed: Jan. 31, 2003

(51) Int. Cl.
*G06T 15/50* (2006.01)

(52) U.S. Cl. ............... 345/426; 345/428; 345/522; 345/582; 345/643; 382/174; 382/199; 382/203

(58) Field of Classification Search ............... 345/426, 345/619, 582, 643, 560, 567
See application file for complete search history.

(56) References Cited

U.S. PATENT DOCUMENTS

| | | | | |
|---|---|---|---|---|
| 3,736,564 | A * | 5/1973 | Watkins ...................... | 345/421 |
| 5,268,988 | A * | 12/1993 | Miyamoto et al. .......... | 392/380 |
| 5,488,700 | A * | 1/1996 | Glassner ..................... | 345/426 |
| 5,561,746 | A * | 10/1996 | Murata et al. .............. | 345/419 |
| 5,706,417 | A | 1/1998 | Adelson | |
| 5,844,566 | A * | 12/1998 | Lecland et al. ............. | 345/426 |
| 5,923,331 | A * | 7/1999 | Dusseux et al. ............ | 345/421 |
| 5,936,628 | A * | 8/1999 | Kitamura et al. ........... | 345/420 |
| 5,995,111 | A | 11/1999 | Morioka et al. | |
| 6,226,006 | B1 | 5/2001 | Collodi | |
| 6,271,861 | B1 * | 8/2001 | Sargent et al. .............. | 345/589 |
| 6,289,133 | B1 | 9/2001 | Oshino | |
| 6,426,755 | B1 | 7/2002 | Deering | |
| 6,468,160 | B2 | 10/2002 | Eliott | |
| 6,489,955 | B1 * | 12/2002 | Newhall, Jr. ................ | 345/419 |
| 6,525,740 | B1 * | 2/2003 | Cosman ...................... | 345/584 |
| 6,552,726 | B2 * | 4/2003 | Hurley et al. ............... | 345/426 |
| 6,563,499 | B1 * | 5/2003 | Waupotitsch et al. ....... | 345/420 |
| 6,614,431 | B1 * | 9/2003 | Collodi ....................... | 345/426 |
| 6,618,054 | B2 | 9/2003 | Deering | |
| 6,712,704 | B2 | 3/2004 | Eliott | |
| 6,769,989 | B2 | 8/2004 | Smith et al. | |
| 6,811,489 | B1 | 11/2004 | Shimizu et al. | |
| 6,900,799 | B2 | 5/2005 | Takeuchi | |
| 6,917,718 | B2 | 7/2005 | Ichimura | |
| 6,925,210 | B2 | 8/2005 | Herf | |
| 6,956,576 | B1 | 10/2005 | Deering et al. | |
| 6,975,324 | B1 * | 12/2005 | Valmiki et al. ............. | 345/555 |
| 6,985,148 | B2 | 1/2006 | Liang et al. | |
| 7,043,695 | B2 * | 5/2006 | Elber et al. ................. | 715/771 |
| 7,068,275 | B2 | 6/2006 | Nakamura et al. | |
| 7,102,647 | B2 | 9/2006 | Sloan et al. | |
| 7,110,602 | B2 * | 9/2006 | Krause ....................... | 382/199 |

(Continued)

OTHER PUBLICATIONS

Max, N., "Atmospheric Illumination and Shadows," ACM SIGGRAPH Computer Graphics, vol. 20, Issue 4, Aug. 1986, pp. 117-124.*

(Continued)

*Primary Examiner*—Kee M. Tung
*Assistant Examiner*—Antonio A Caschera
(74) *Attorney, Agent, or Firm*—Lee & Hayes, PLLC

(57) ABSTRACT

A technique for graphically processing perimeter information includes determining a polar representation of the perimeter of an object to define polar perimeter information, storing the polar perimeter information, retrieving the stored polar perimeter information using an overlay, and applying the retrieved polar perimeter information to provide a graphical effect within a scene (such as, but not limited to, a shadow effect).

18 Claims, 16 Drawing Sheets

U.S. PATENT DOCUMENTS

| | | | |
|---|---|---|---|
| 2001/0017935 A1* | 8/2001 | Suzaki et al. | 382/110 |
| 2001/0045956 A1* | 11/2001 | Hurley et al. | 345/582 |
| 2001/0048444 A1* | 12/2001 | Hurley et al. | 345/589 |
| 2003/0002730 A1* | 1/2003 | Petrich | 382/154 |
| 2003/0189568 A1 | 10/2003 | Alkouh | |
| 2003/0234789 A1* | 12/2003 | Gritz | 345/474 |
| 2004/0086184 A1* | 5/2004 | Kondo et al. | 382/203 |
| 2004/0100465 A1* | 5/2004 | Stowe et al. | 345/427 |
| 2004/0113911 A1* | 6/2004 | Collodi | 345/426 |
| 2004/0162137 A1 | 8/2004 | Eliott | |
| 2004/0197022 A1* | 10/2004 | Gonsalves | 382/167 |
| 2004/0199531 A1* | 10/2004 | Kim et al. | 707/100 |
| 2004/0228529 A1* | 11/2004 | Jerebko et al. | 382/173 |

OTHER PUBLICATIONS

Turkowski, K., "Anti-Aliasing through the Use of Coordinate Transformations," ACM Transactions on Graphics, vol. 1, Issue 3, Jul. 1982, pp. 215-233.*

Chang, M.-C., Lai, F., Chen, W.-C., "Image Shading Taking into Account Relativistic Effects," ACM Transactions on Graphics, vol. 15, No. 4, Oct. 1996, pp. 265-300.*

Goral, C. et al., "Modeling the Interaction of Light Between Diffuse Surfaces," Computer Graphics SIGGRAPH 84, vol. 18, No. 3, Jul. 1984, pp. 213-222.*

Wikipedia.com Definition of Polar Coordinates http://en.wikipedia.org/wiki/Polar_coordinate#Polar_coordinates.*

Wolfgang F. Engel, Direct3D ShaderX: Vertex and Pixel Shader Tips and Tricks, 2002, Wordware Publishing, Inc., pp. 72-124.

Cass Everitt, "Projective Texture Mapping," available at NVIDIA website (http://developer.nvidia.com/view.asp?IO=Projective_Texture_Mapping), listing a date of 2001, 7 pages.

Sim Dietrich, presentation entitled "Shadow Techniques," available at NVIDIA website (http://developer.nvidia.com/view.asp?IO=gdc2001_shadow_techniques), listing a date of 2001, 57 pages.

Wikipedia online encyclopedia article, "Shadow Volume," accessible at <<<URL: http://en.wikipedia.org/wiki/Shadow_Volumes>>, accessed on Aug. 3, 2005, 2 pages.

Online article entitled, "Shadow Volumes," accessible at <<URL: http://www.cc.gatech.edu/classes/AY2004/cs4451a_fall/sv.pdf>>, accessed on Aug. 3, 2005, 7 pages.

Online article entitled, "Shadow Volumes," accessible at <<URL: http://www.caip.rutgers.edu/~kuttuva/shadow_volumes.html>>, accessed on Aug. 3, 2005, 4 pages.

Brabec et al., "Shadow Volumes on Programmable Graphics Hardware," Eurographics 2003, vol. 22, No. 3, 2003, 8 pages.

Wikipedia Online Encyclopedia, "Golden Eye 007", available at <<http://en.wikipedia.org/wiki/GoldenEye_007>>, accessed on Dec. 12, 2005, 11 pages.

Bikker, "Bilinear Filtering (Interpolation)," Flipcode, Daily Game Development News and Resources, Jan. 13, 1999, accessed on May 18, 2006, 3 pages.

Screen shot from "Halo: Combat Evolved," accessible at <<http://flea.samware.net/Halo%20Zoom.JPG>>, accessed on May 15, 2006, 1 page.

Screen shot from "Halo: Combat Evolved," accessible at <<http://telefragged.com/indes.php3?file=reviews/halo-pc/shots>>>>, accessed on May 15, 2006, 2 pages.

Rose, "SAMS Teach Yourself Adobe Photoshop 5.5 in 24 hours," Oct. 1999, Sams Publishing, p. 329.

Stanley, "The Complete Idiots Guide to Adobe Photoshop 5," 1999, Macmillan Computer Publishing, pp. 89-93.

"Halo: Combat Evolved", Microsoft, 2001, pp. 1-16.

Salvator, "ExtremeTech 3D Pipeline Tutorial", <<http://www.extremetech.com/print_article2/0, 1217, a=2674,00. asp>>, Ziff Davis Media Inc., 2007, pp. 39.

* cited by examiner

GRAPHICAL PROCESSING OF OBJECT PERIMETER INFORMATION

TECHNICAL FIELD

This invention relates to the graphical processing of object perimeter information, and, more particularly, to the generation of object perimeter information and the subsequent use of the object perimeter information to provide a graphical effect.

BACKGROUND

Designers of computer graphics applications continually strive to improve the realism of rendered scenes. For instance, computer game applications typically demand realism to increase the player's interest in the game, and hence, to enhance the marketability of the game. For example, game designers have been challenged to provide ever-increasing realism in such special effects as fire, explosions, smoke, fog, rain, lens flares, waves, etc. A first challenge is to devise a technique for simulating a special effect in the graphical realm. A second challenge is to implement this technique within the sometimes significant constraints of the hardware and processing limitations of a particular game-playing platform. More specifically, a designer may devise a theoretically sound technique for providing a special effect, but may find that the technique it is too "expensive" to implement within a particular game-playing platform. For instance, the technique may slow a game to an intolerable level, or may make too many demands on the game-playing platform's resources (such as the game-playing platform's memory resources).

An important special effect that contributes to the realism of a rendered scene is the generation of shadows. Several techniques exist for rendering shadows of objects within a scene. In a so-called "shadow volume" technique, the graphical application forms a polygonal volume to represent the shadow (referred to as a shadow volume). A stencil buffer can be used to determine what portions of the scene intersect with the shadow volume. In a so-called "shadow mapping" technique, the graphical application forms a two-dimensional distance texture map which represents the distances between different points on an object and a light source (when the object is viewed from the vantage point of the light source). This distance texture map is then projected onto the scene to determine portions of the scene that are inside a shadow cast by the object, and portions which are outside the shadow. While both of these techniques generate realistic shadows, they may fail to provide a sufficient degree of efficiency for all applications. More specifically, for relatively simple objects within a scene, a designer may wish to employ less precise methods for computing a shadow so as not to unduly slow the rendering of the scene.

Accordingly, there is an exemplary need in the art for an efficient technique for generating graphical effects, such as, but not limited to, shadow effects.

SUMMARY

A technique is described herein for processing polar perimeter information which addresses the above-described need. The technique includes the steps of: (a) determining a polar representation of the perimeter of an object to define polar perimeter information; (b) storing the polar perimeter information; and (c) applying the polar perimeter information to provide a graphical effect within a scene (such as, but not limited to, a shadow effect).

Step (a) entails rendering a depiction of the object from a vantage point of a light source. The depiction of the object includes a plurality of object elements, where a subset of the object elements forms the perimeter of the object. Step (a) also entails ascertaining polar coordinates defining respective positions of these object elements that form the perimeter of the object. This task can be performed by identifying maximum polar radius values at each of a plurality of polar angle values.

Step (b) entails storing the polar coordinates of the object elements that form the perimeter of the object. This may involve storing polar perimeter radius values in storage slots that are associated with respective polar angle values. The storing further comprises storing transform information that reflects an orientation of the object with respect to the light source vantage point.

Step (c) entails determining a location to apply the polar perimeter information within the scene as defined by texture coordinates, and then applying the polar perimeter information at the determined location within the scene. The applying operation involves placing an overlay on top of the scene at the determined location, and retrieving the polar perimeter information using the overlay. More particularly, the overlay includes two components: a polar angle indexing component, and a radius determination component. The retrieving operation entails using the polar angle indexing component to retrieve stored polar perimeter radius values associated with respective polar angle values identified by the angle indexing component. The radius determination component is used to determine polar radius values within the scene, where the polar radius values define respective distances between points in the scene and a reference center point. An effect is then provided on the basis of the retrieved polar perimeter radius values and the determined polar radius values. For instance, a shadow can be applied to the scene, where the applied shadow is representative of a shadow cast by the object.

In brief, the technique provides an efficient strategy for packing and unpacking object perimeter information to provide a graphical effect. The technique is efficient because it allows for the storage of perimeter information using reduced memory space. The efficiency of the above-described technique also ensues from its streamlined strategy for unpacking the perimeter information and applying the perimeter information to a scene.

Figure 1:
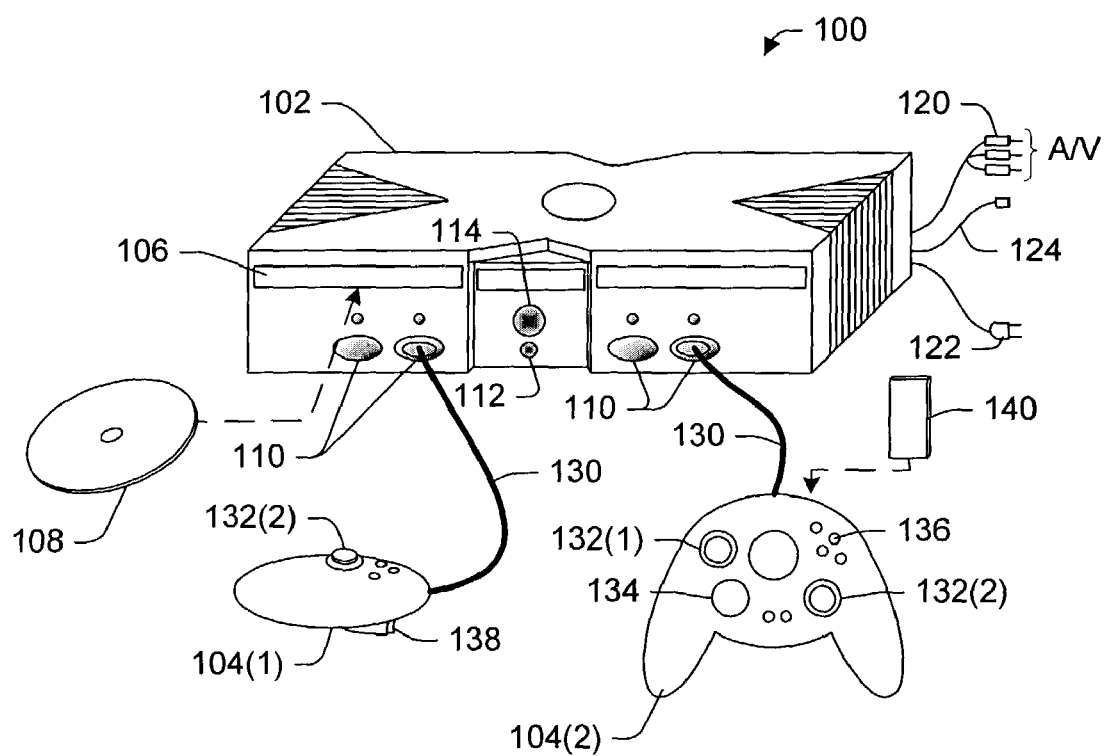
FIG. 1 shows an exemplary gaming system with a game console and one or more controllers for implementing the graphical processing of perimeter information.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to a technique for generating object perimeter information in a polar representation, and for subsequently applying the object perimeter information to a scene to provide a special effect. As used here, the term "perimeter information" defines any information that can be used to define the perimeter of a graphical object. In one implementation, the perimeter information may represent a two-dimensional contour of an object. In another implementation, the perimeter information may represent a three-dimensional contour of an object. Likewise, a wide variety of special effects can be generated based on the perimeter information. For instance, this disclosure primarily discusses the use of perimeter information to generate shadows. Other graphical effects that can be generated using perimeter information include various silhouette-related effects, various object contour-enhancement effects, various volumetric force-field effects, and so on. Volumetric force-field effects rely on the generation and application of three-dimensional perimeter information (e.g., where a field-like aura can be drawn around an object).

The technique can be applied to provide a graphical effect (such as a shadow) for both relatively simple objects and relatively complex objects. But because of its efficiency, the technique is particularly attractive for rendering graphical effects for stationary objects in a scene. A designer may then opt to render graphical effects for more complex objects (such as moving objects) using a different technique. However, this is merely one exemplary application of the technique; nothing in this disclosure should be construed as limiting the technique to any specific class of objects, such as stationary objects.

Further, this disclosure describes the generation and application of object perimeter information in the exemplary context of a gaming system. However, the technique described herein can be applied in any graphical processing context, such as simulation environments, computer-aided design and manufacturing environments, medical imaging environments, computer-aided navigation of resources, etc.

The disclosure includes: Section A describing an exemplary gaming system for use in generating the graphical effect based on perimeter information (referencing FIGS. 1 and 2); Section B describing an exemplary three dimensional processing pipeline (referencing FIGS. 3-10); and Section C specifically describing the logic and steps used to generate and apply object perimeter information (referencing FIGS. 11-18). Section C includes a first subsection describing the generation of object perimeter information, and a second subsection describing the application of object perimeter information.

A. EXEMPLARY GAMING SYSTEM

FIG. 1 shows an exemplary gaming system 100. It includes a game console 102 and up to four controllers, as represented by controllers 104(1) and 104(2). The game console 102 is equipped with an internal hard disk drive and a portable media drive 106. The portable media drive 106 supports various forms of portable storage media as represented by optical storage disc 108. Examples of suitable portable storage media include DVD, CD-ROM, game discs, game cartridges, and so forth.

The game console 102 has four slots 110 on its front face to support up to four controllers, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be equipped with internal or externally added network capabilities, as represented by the cable or modem connector 124 to facilitate access to a network, such as a local area network (LAN) or the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and transport them for play on other consoles. In the described implementation, each controller is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back includes:

1. Game titles played from CD and DVD discs, from the hard disk drive, or from an online source.

2. Digital music played from a CD in the portable media drive 106, from a compressed file on the hard disk drive (e.g., Windows Media Audio (WMA) format), or from online streaming sources.

3. Digital audio/video played from a DVD disc in the portable media drive 106, from a file on the hard disk drive (e.g., Windows Media Video (WMV) format), or from online streaming sources.

Figure 2:
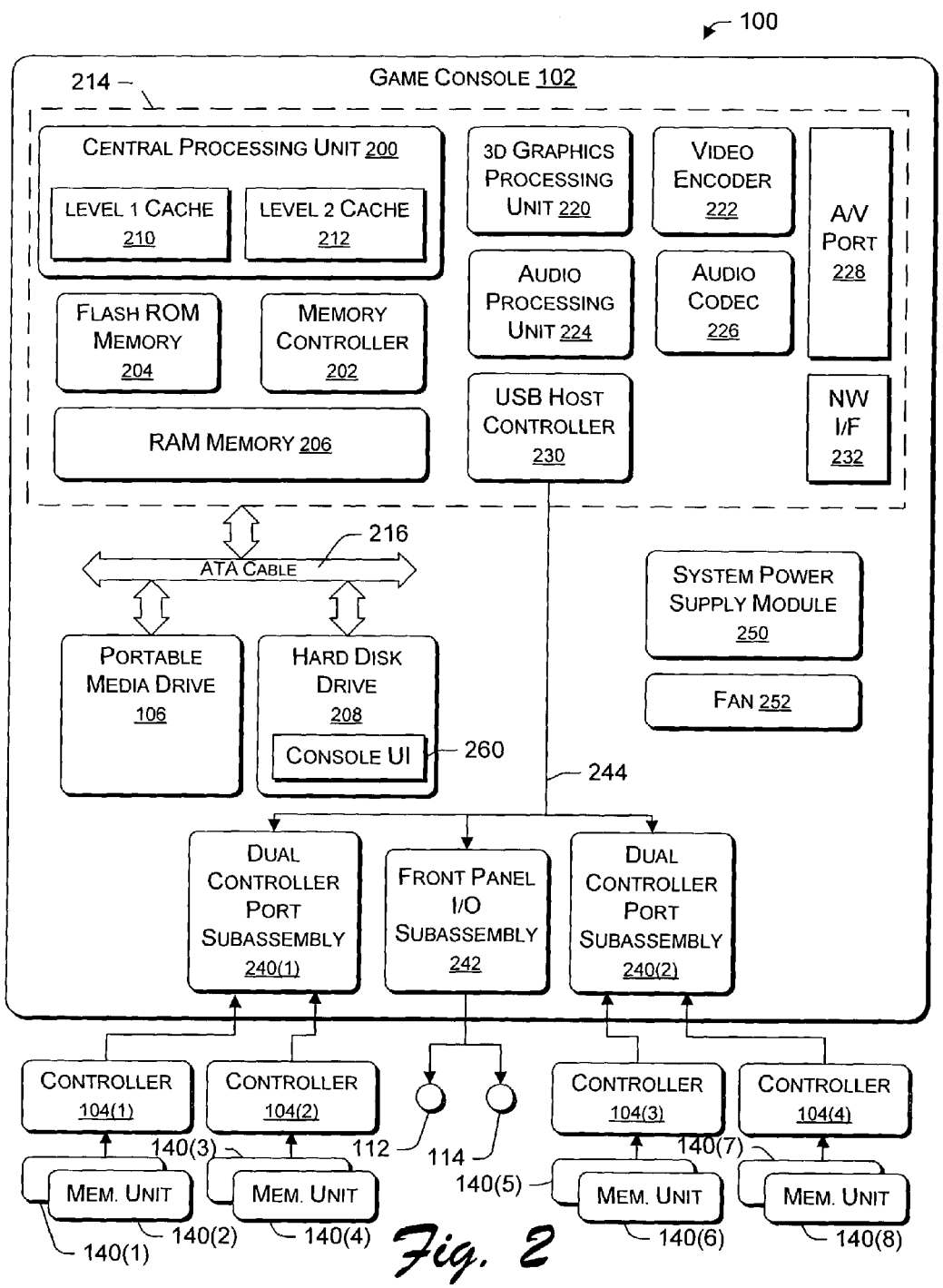
FIG. 2 shows a block diagram of the gaming system shown in FIG. 1.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240(2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

A console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The game console 102 implements a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

The gaming system 100 may be operated as a standalone system by simply connecting the system to a television or other display. In this standalone mode, the gaming system 100 allows one or more players to play games, watch movies, or listen to music. However, with the integration of network connectivity made available through the network interface 232, the gaming system 100 may further be operated as a participant in a larger network gaming community.

Video games may be stored on various storage media for play on the game console. For instance, a video game may be stored on the portable storage disc 108, which is read by drive 106. Alternatively, the video game may be stored in hard disk drive 208, being transferred from a portable storage medium or downloaded from a network. During play, portions of the game are temporarily loaded into RAM memory 206, caches 210 and 212, and executed by the CPU 200. One particular video game of the shooter genre is described in the following sections.

The above gaming playing environment is exemplary. The graphical processing of perimeter information can be implemented using other types of computing devices than the console-based module discussed above. For instance, the graphical processing of perimeter information can also be implemented on an arcade-type game machine, a personal computer, or other kind of general or special purpose computing device.

B. THREE DIMENSIONAL PROCESSING PIPELINE

The following section discusses an exemplary three dimensional (3D) graphics tool environment for implementing the processing of polar perimeter information. Generally, a 3D graphics tool converts input data into a rendered 3D scene. The conversion takes place in a series of stages. The stages form a 3D processing pipeline. In one implementation, the Microsoft® DirectX® 8.(n) rendering tool produced by Microsoft Corporation of Redmond, Wash. can be used to provide the 3D processing environment. However, the graphical processing of perimeter information can be implemented using other rendering tools. Machine-readable code for implementing the processing pipeline can be stored within any memory module, or any combination of memory modules, identified above in the context of FIG. 2. Parts of the pipeline's functionality can also be implemented in function-specific processing modules, such as the 3D graphics processing unit 220.

Figure 3:
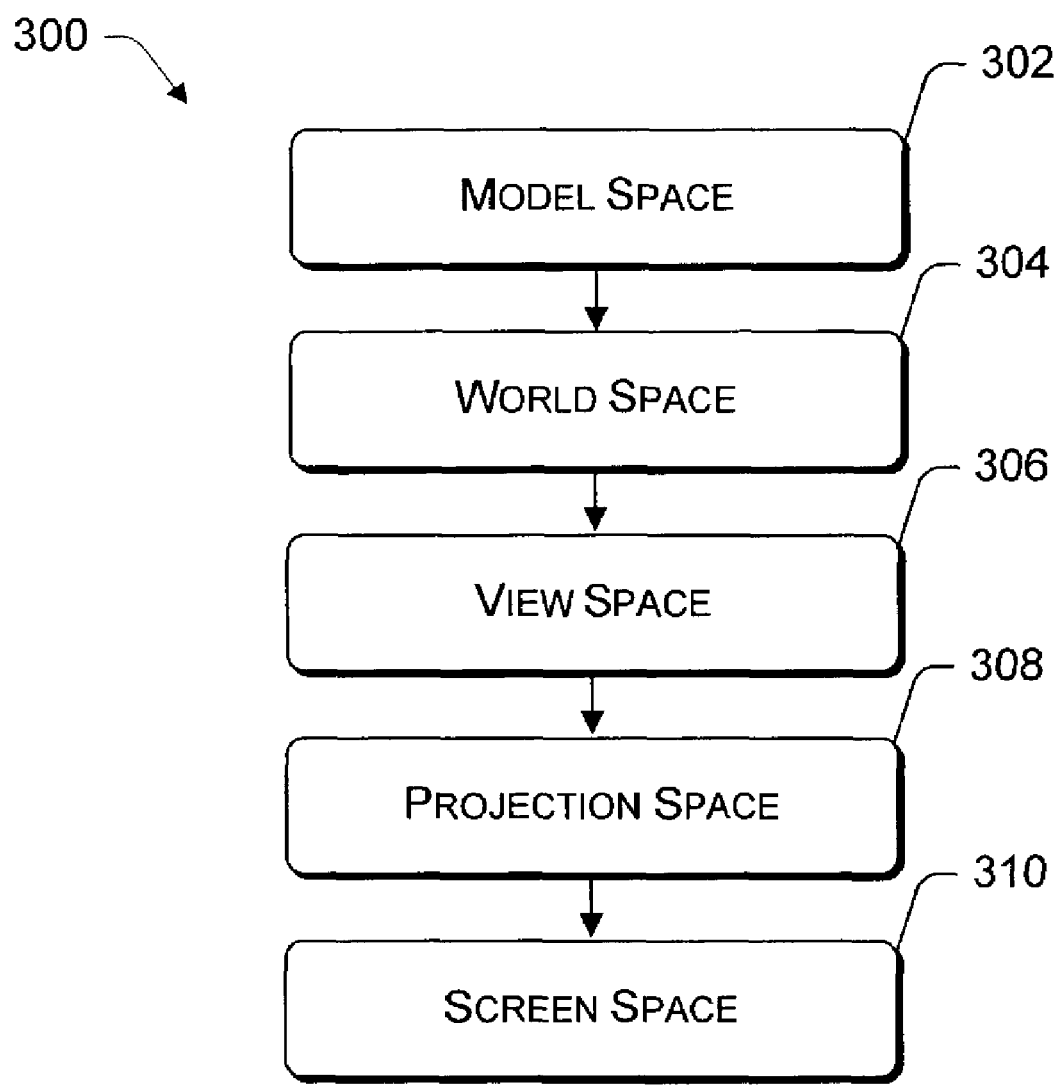
FIG. 3 shows a geometry pipeline used to produce a three dimensional scene.

To begin with, FIG. 3 shows a geometry pipeline 300 for transforming the input data to a final rendered scene. The geometry pipeline 300 includes a plurality of spaces. A "space" refers to a coordinate system scheme for positioning objects within a frame of reference. Generally, Microsoft® DirectX® 8.(n) uses left-handed coordinate systems. In a left-handed system, the Z-axis (depth-related axis) extends away from the user into the scene (or if printed on paper, "into" the paper).

FIG. 3 generally shows the conversion of input vertex data from model space 302 to world space 304, from world space 304 to view space 306, from view space 306 to projection space 308, and from projection space 308 to screen space 310. Typically, multiple matrices are used to perform each transformation. These matrices can be concatenated to provide a single transformation matrix that contains the aggregate transformation effect of the individual matrices.

The geometry pipeline 300 begins in so-called model space 302. A "model" refers to an object that will be included in the rendered scene, such as a character, weapon, vehicle, tree, etc. Each model includes a plurality of vertices (points in space) associated therewith. Model space 302 is a frame of reference that defines a model's vertices relative to an origin local to the 3-D model. Thus, if the model pertained to a human character, the model space 302 might provide vertices relative to an origin located at the center of the human character.

The geometry pipeline 300 next transforms model space 302 into world space 304. In world space 304, vertices are defined relative to a global origin common to all the objects (models) in a scene. In other words, the world transformation assembles models into a scene, and defines a common point of reference for determining different locations in the scene.

The geometry pipeline 300 next transforms world space 304 into view space 306 (also referred to as "camera space"). A "view" or a "camera" defines the vantage point from which a viewer observes the scene. Accordingly, the world space coordinates are relocated and rotated around this vantage point to provide the view space 306. More specifically, view space (or camera space) 306 refers to a frame of reference in which the viewer is at the origin, looking in the direction of the positive Z-axis into the viewing volume (also referred to as a "viewing frustum").

The geometry pipeline 300 next transforms view space 306 into projection space 308. In this transformation, objects in view space 306 are scaled with relation to their distance from the viewer in order to give the illusion of depth to a scene. That is, close objects are made to appear larger than distant objects, and so on. The resultant projection space 308 is a homogeneous cuboid space in which all vertices in a scene have X- and Y-coordinates that range from −1.0 to 1.0, and a Z-coordinate that ranges from 0.0 to 1.0.

Finally, the geometry pipeline 300 transforms perspective space 308 into screen space 310. Screen space 310 refers to a frame of reference in which coordinates are related directly to 2-D locations in a frame buffer, to be displayed on a monitor or other viewing device. The origin, or (0,0), is defined to be the upper left corner. The "Y" axis increases in the downward direction, and the "X" axis increases to the right.

Figure 4:
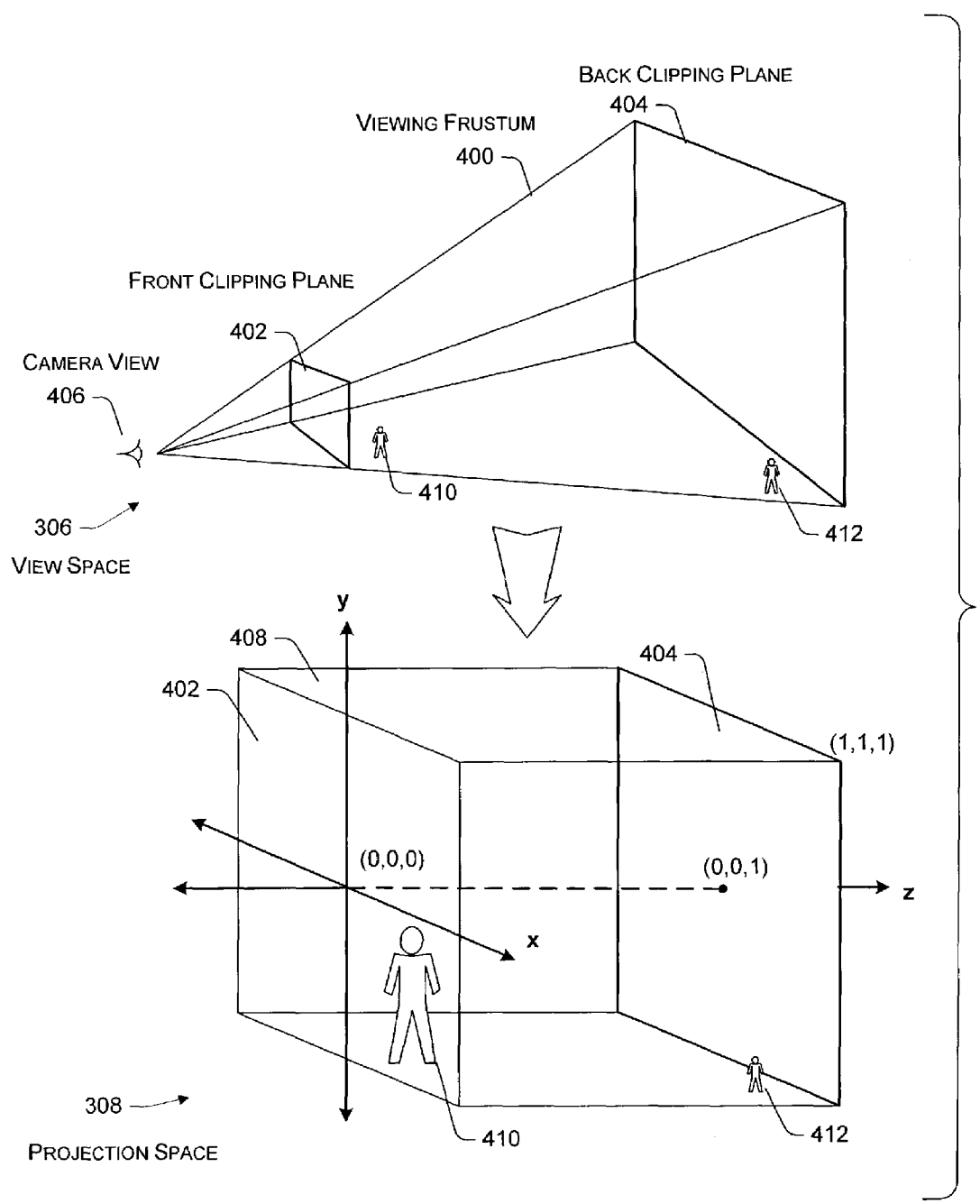
FIG. 4 shows an exemplary viewing frustum produced by the geometry pipeline in FIG. 3.

FIG. 4 shows a viewing frustum 400 produced in view space 306, and subsequently transformed into projection space 308. With reference to the view space 306 depiction, the viewing frustum 400 is bounded on one end by a front clipping plane 402, and on the other end by a back clipping plane 404. The outer "walls" of the viewing frustum 400 converge at a point, referred to as the camera view 406. Accordingly, the viewing frustum 400 assumes a truncated pyramidal shape. The projection transformation subsequently transforms this truncated pyramidal shape into a cuboid volume 408 in projection space 308 having X- and Y-coordinates that range from −1.0 to 1.0 and a Z-coordinate that ranges from 0.0 to 1.0.

With reference to the view space 306 depiction, a viewer "looks into" the viewing frustum scene from the vantage point of the camera view point 406. When rendered, objects close to the front clipping plane 402 will appear close to the viewer, and objects far from the front clipping plane 402 will appear far away from the viewer. Objects that lie entirely outside the viewing frustum 400 are not rendered for display. For instance, FIG. 4 shows two exemplary objects (410 and 412) located in the viewing frustum 400 in view space 306. Object 410 is closest to the front plane 402, and therefore will appear to be closest to the viewer when the scene is rendered. Object 412 is located farthest from the front plane 402, and therefore will appear to be farthest from the viewer when the scene is rendered. In projection space 308, to provide the necessary perspective effect, objects become smaller as they move away from the front clipping plane 402. For instance, object 412 is smaller than object 410.

Figure 5:
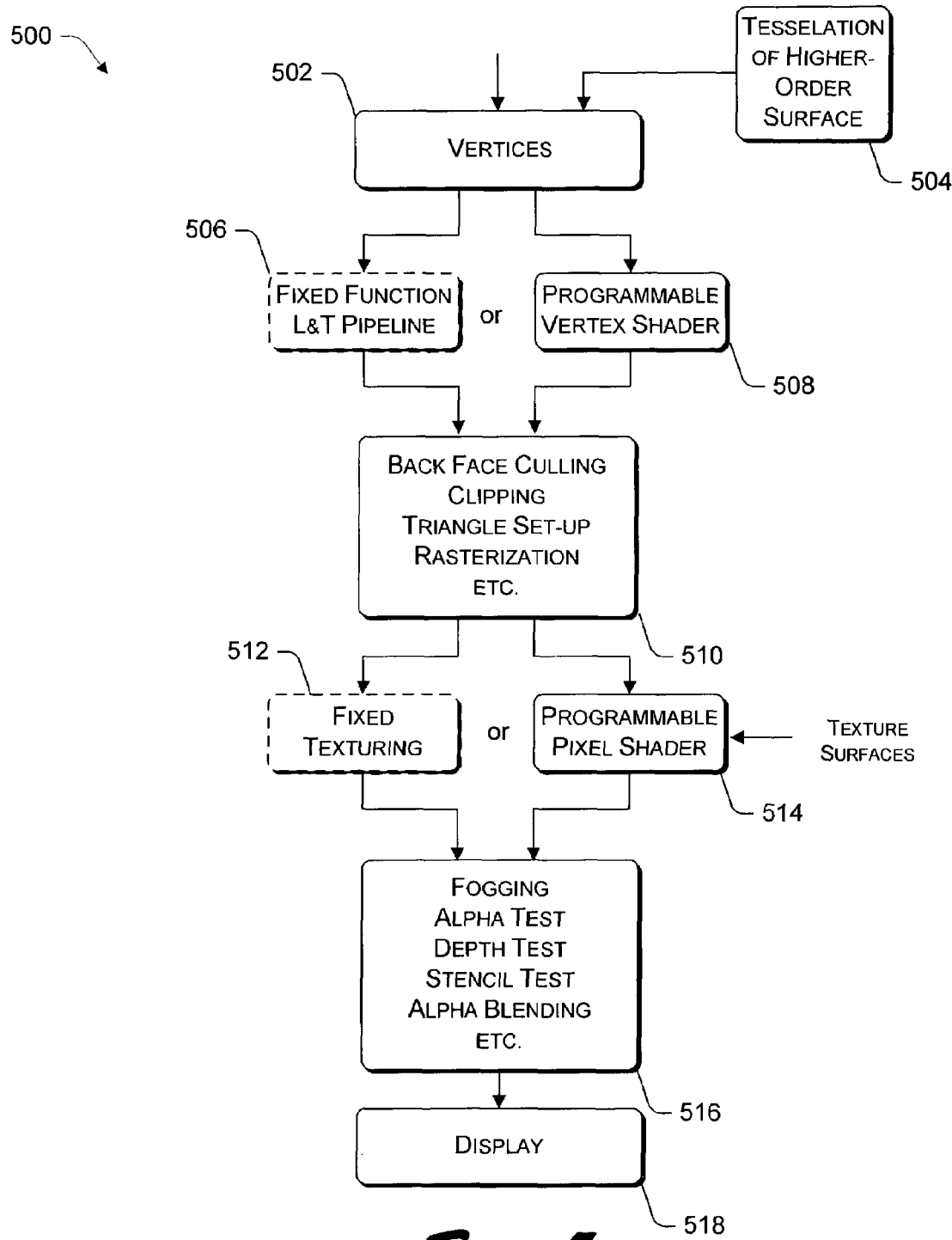
FIG. 5 shows an exemplary three dimensional processing pipeline for use in the graphical processing of perimeter information.

FIG. 5 shows an exemplary graphics pipeline 500 for transforming input data into a final rendered 3D display. The various steps in FIG. 5 correspond to different processing stages. The processing stages may operate in parallel; that is, while the lower stages are processing one scene, the early stages are occupied with inputting and processing a next scene.

In operation 502, the processing pipeline 500 receives input data in the form of vertices. More specifically, the input operation may comprise specifying a collection of models which will populate a scene. Models are formed from an assemblage of primitives, which, in turn, are formed from a plurality of vertices. Triangles are common primitives. The input may also include models that include so-called "higher-order surfaces," such as B-spline surfaces, Bézier surfaces, n-patches, etc. However, before processing these surfaces, the 3D pipeline 500 breaks these surfaces down into more elementary primitives, such as triangles. The process of breaking down these higher order surfaces is referred to as tessellation 504.

Steps 506 and 508 include performing vertex operations on the vertex data assembled in step 502. In the Microsoft® DirectX® 8.(n) processing tool, a designer may choose between a conventional fixed lighting and transformation (L&T) pipeline 506 to perform this task, or a programmable vertex shader 508. As the name suggests, the fixed L&T pipeline 506 cannot be modified by the designer, beyond inputting setup parameters to govern its operations. In contrast, the designer can tailor the operations performed by the programmable vertex shader 508 by appropriately programming the vertex shader 506. In general, the L&T pipeline 506 and the programmable vertex shader 508 can be used to geometrically transform the vertex data (in the manner described above in the context of FIG. 3) and apply lighting (e.g., shading) to the vertex data.

Step 510 includes a plurality of operations. A backface culling operation removes those triangles that would not be visible because they face away from the viewer. This can reduce the processing load on the pipeline by eliminating, on average, half of the world triangles in the scene.

A clipping operation removes or modifies primitives that lie outside the viewing frustum 400. That is, any triangle that lies entirely outside the viewing frustum 400 will be eliminated. Any triangle that lies partially outside the viewing frustum 400 will be clipped accordingly.

At this point, the objects to be rendered still have not been "fleshed out" by applying pixels to the objects' primitives. The triangle set-up operation and the rasterization operation perform this task. Namely, the triangle set-up operation defines the pixel coordinates for the outlines of triangles in a scene, and performs other set-up related tasks in preparation for the rasterization operation. The rasterization operation assigns pixels to surfaces of the triangles using the results of the set-up operation. It performs this task by interpolating color and depth values based on the values computed in the set-up operation.

Figure 6:
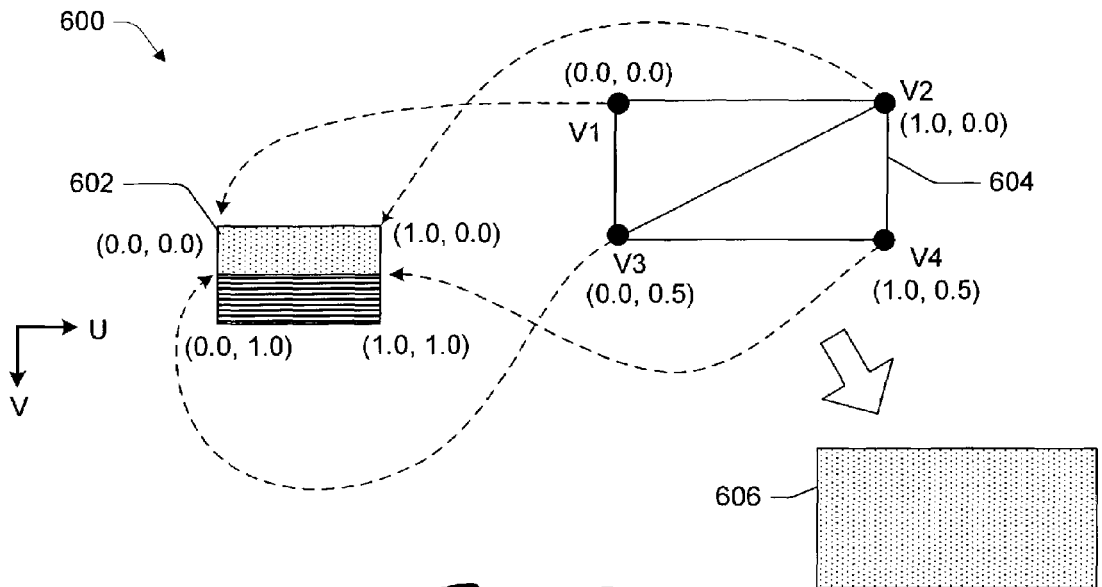
FIG. 6 shows an exemplary application of a texture to a polygon.
Figure 7:
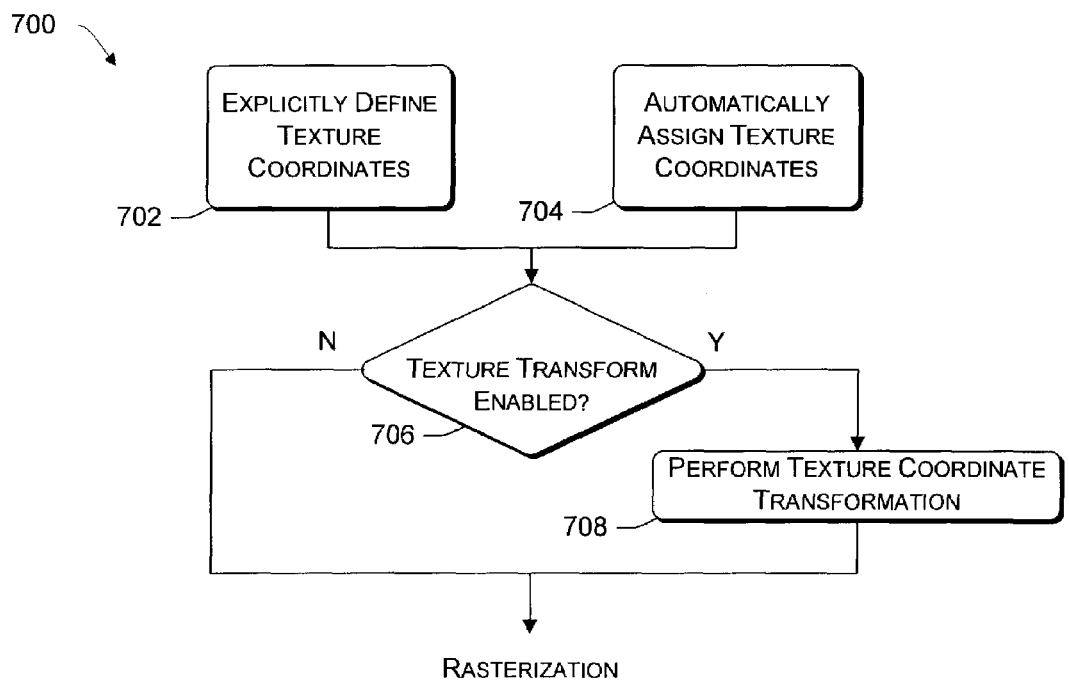
FIG. 7 shows an exemplary method for providing and transforming texture coordinates.

The remaining steps in the pipeline now operate on pixel data, rather than vertex data. For instance, steps 512 and 514 can be used to perform a variety of pixel-level operations, such as adding textures to the surfaces of the primitives. A texture is a bitmap image that is, in effect, "pasted" onto the surfaces of the primitives at a location specified by texture coordinates supplied by earlier stages in the processing pipeline 500. Textures can be used to provide realistic looking scene content to the primitives, such as brick wall detail, wood grain detail, clothing detail, skin and facial expression detail, and so on. A texel refers to a single element in a texture. FIGS. 6 and 7, to be discussed shortly, provide additional details regarding texture processing operations performed in the processing pipeline 500.

Figure 8:
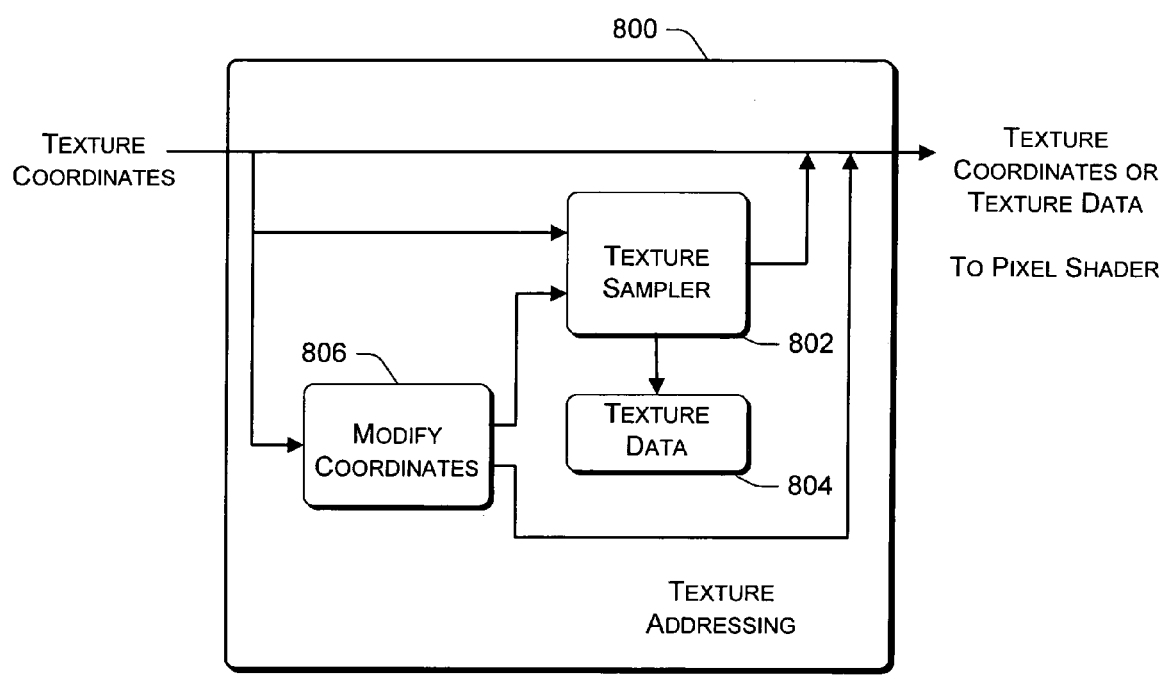
FIG. 8 shows an exemplary texture addressing module for use in the processing pipeline of FIG. 5.
Figure 9:
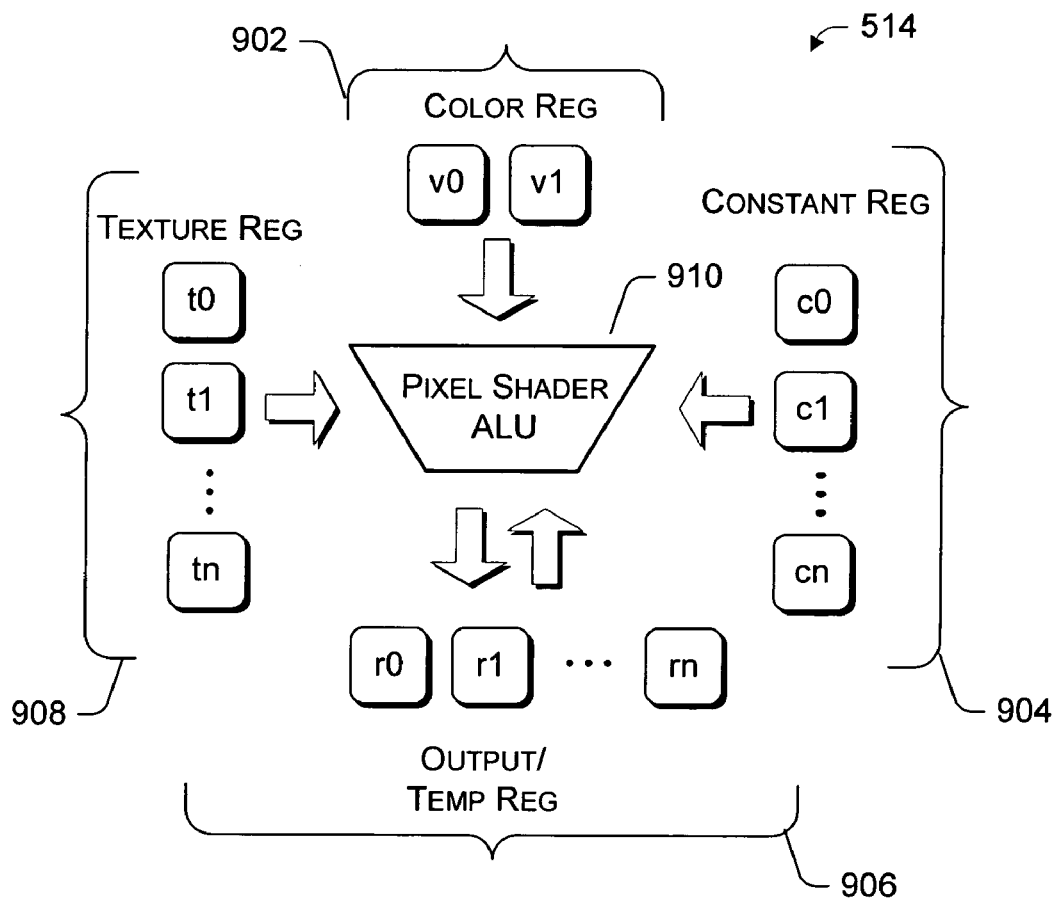
FIG. 9 shows an exemplary pixel shader for use in the processing pipeline of FIG. 5.
Figure 10:
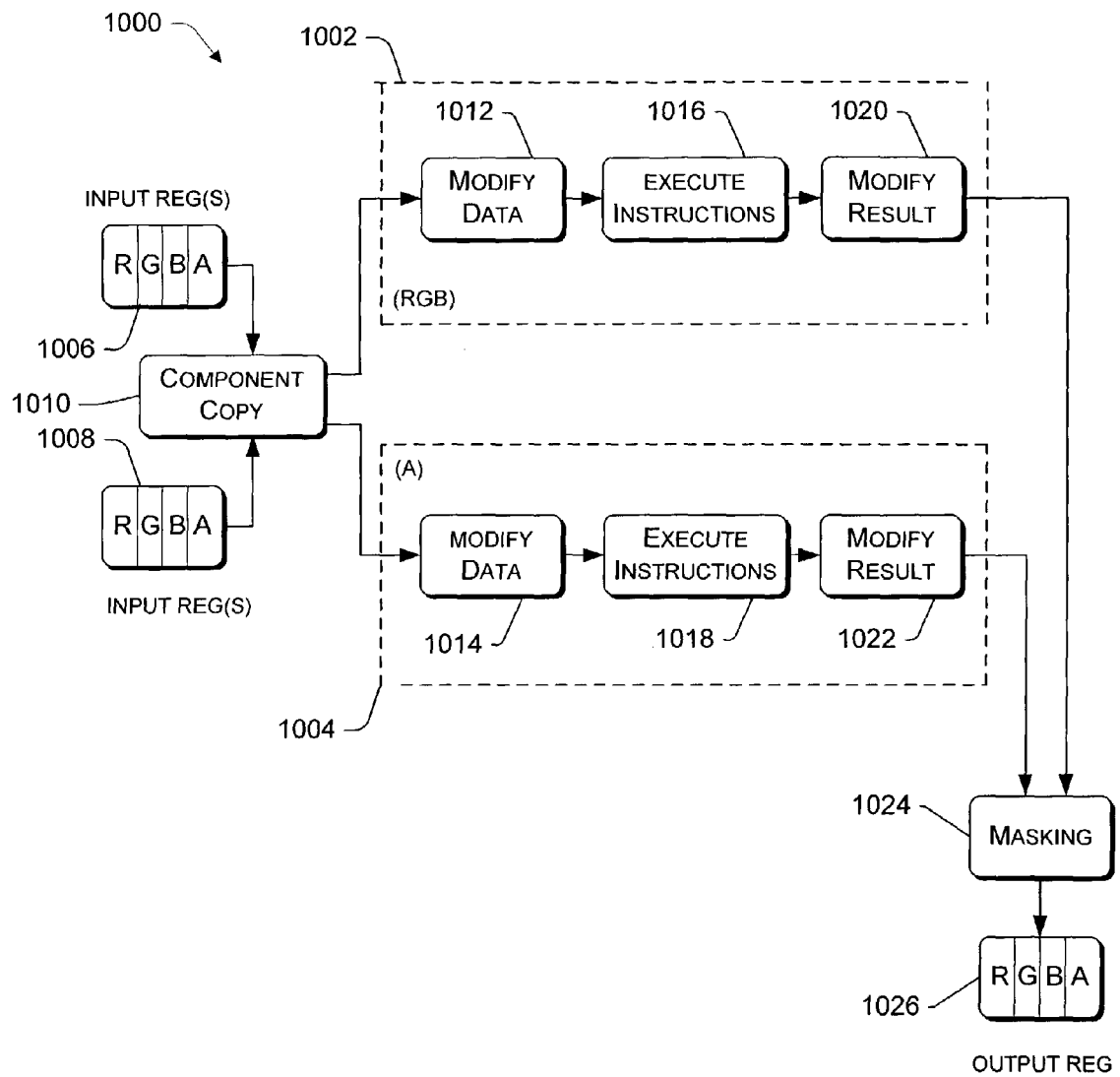
FIG. 10 shows an exemplary processing pipeline used by an arithmetic logic unit of the pixel shader shown in FIG. 9.

Again, the Microsoft® DirectX®8.(n) rendering tool gives the user the option of performing pixel-based operations using a fixed multi-texturing operation 512 or a programmable pixel shader 514. In one implementation, the processing of perimeter information is performed using the programmable pixel shader 514, and hence emphasis will be placed on this unit in the ensuing discussion. FIGS. 8-10, to be discussed shortly, provide additional details regarding the programmable pixel shader 514. In general, the pixel shader 514 can be used to perform various pixel-level operations on color data (received from the L&T pipeline 506 or vertex shader 508) and texture data on the basis of instructions provided to the pixel shader 514.

Step 516 groups together several operations that can be performed on the output of the pixel shader 514 (or fixed module 512). The fogging step can be used to apply a fog visual effect to the developing scene. Fog can be implemented by blending the color of objects in a scene with a chosen fog color based on the depth of an object in a scene or its distance from the viewpoint. As objects grow more distant, their original color increasingly blends with the chosen fog color, creating the illusion that the object is being increasingly obscured by tiny particles floating in the scene.

An alpha test performed in step 516 serves to remove pixels that would not be visible based on their alpha values. That is, a pixel has color channels corresponding to red (R), blue (B), green (G), and alpha (A) components. An alpha value reflects the transparency of the RGB aspects of the pixel when rendered to a scene. The alpha test compares the alpha value with a reference threshold, and discards pixels that have alpha values that are below this threshold.

The depth test examines a depth buffer to determine whether a pixel under consideration (referred to as a test pixel here) is visible. It performs this task by comparing depth information associated with the test pixel with depth information stored in the depth buffer. According to one exemplary procedure, if the depth buffer indicates that another pixel is located closer to the camera than the test pixel at a corresponding location, that other pixel occludes the test pixel, and the test pixel will not be visible in the rendered scene. In this event, the test pixel is removed. If the test pixel has a depth value that is smaller than the depth value stored in the depth buffer, then the depth value of the test pixel replaces the depth value stored in the depth buffer. In this manner, the depth buffer maintains a record of only the visible entries within the viewing frustum 400. Other procedures can be used to perform the depth test than the procedure described above.

The stencil test masks a pixel under consideration with information provided in a stencil buffer. A stencil buffer operates in the same manner as a physical stencil. A certain scene can be projected within a boundary defined by the stencil, and excluded outside the boundary. For instance, in a flight simulator, a stencil buffer may be set up to govern the display of scenery through the window of the cockpit, where the stencil defines the contours of the cockpit window.

The blending operation serves to blend a pixel into a preexisting scene. The blending operation is governed by the following equation:

Final color=source color*source blend factor+destination color*destination blend factor.

In this equation, the destination pixel color represents the color of the pixel in the pre-existing scene, and the source pixel color represents the new pixel color that the blending engine intends to add to the destination pixel. The blending factors vary from 0 to 1 and are used to control how much contribution the source and the destination pixel colors have in the final color value. In the extreme case, if the source blending factor is 1 and the destination blend factor is 0, then the new pixel color will entirely replace (e.g., overwrite) the destination pixel color.

Although not illustrated, step 516 can also include a number of other conventional pipeline operations, such as dithering, etc.

In step 518, the final scene is displayed. A common exemplary pipeline strategy is to render the scene under development to a back buffer while a previous scene is being projected to a screen using a front buffer. Once the scene under development is ready for display, the back buffer assumes the role of the front buffer, and the front buffer assumes the role of the back buffer (for rendering the next scene). Scenes are projected onto the game playing monitor for typically a very short time, such as 17 ms.

FIGS. 6-8 provide details on the application of textures to polygon surfaces. To begin with, FIG. 6 shows a texturing application operation 600 in which a texture 602 is applied to a polygon 604. The polygon 604 is comprised of two triangle primitives assembled to form a rectangle. The polygon 604 includes four vertices, V1, V2, V3, and V4.

Each vertex includes texture coordinates. The texture coordinates are specified with respect to a conventional U and V reference system. In this reference system, the U coordinate generally corresponds to an X axis, and the V coordinate generally corresponds to a Y axis. Values in the U axis are clamped to range from 0.0 to 1.0, and values in the V axis are likewise clamped to range from 0.0 to 1.0.

The texture coordinates associated with the vertices specify how the texture 602 is to be placed onto the polygon 604. In the exemplary case of FIG. 6, vertex V1 has texture coordinates of 0.0, 0.0, which corresponds to the upper left corner of the texture 602. Vertex V2 has texture coordinates 1.0, 0.0, which corresponds to the upper right corner of the surface 602. Vertex V3 has texture coordinates 0.0, 0.5, which corresponds to the middle of the left edge of the texture 602. And vertex V4 has texture coordinates 1.0, 0.5, which corresponds to the middle of the right edge of the texture 602. Accordingly, when the texture 602 is mapped onto the polygon 604 in accordance with the texture coordinates, only the upper half of the texture 602 will be applied to the polygon 604. The result of the application of texture 602 to the polygon 604 is shown in textured surface 606.

FIG. 7 shows a flowchart 700 that identifies various ways that texture coordinates can be assigned to vertices and (if desired) subsequently modified. These functions are performed by the vertex shader 508 (or its fixed function counterpart, L&T pipeline 506). According to operation 702, a designer explicitly defines the texture coordinates associated with input vertices. For instance, through the flexible vertex format (FVF) of Microsoft® DirectX® 8.(n), texture coordinates can be declared in different formats, allowing textures to be addressed using as few as one coordinate or as many as four texture coordinates. On the other hand, according to operation 704, the designer may rely on the processing pipeline 500 to automatically generate texture coordinates. For instance, the processing pipeline 500 can use the transformed camera-space position or the normal from a vertex as texture coordinates. Automatically generated texture coordinates can significantly reduce the bandwidth required for geometry data by eliminating the need for providing explicit texture coordinates in the vertex format.

After being created, texture coordinates can be modified by the processing pipeline 500. For instance, operation 706 determines whether the processing pipeline 500 is currently configured to execute a transformation of texture coordinates. If so, operation 708 performs the transformation. This task can be performed by applying a 4×4 transformation matrix to the existing texture coordinates to provide new texture coordinates. The transformation matrix may affect various combinations of scales, rotations, translations, shears, etc. (The processing performed here is analogous to the geometric processing described above in the context of FIG. 3.) Texture coordinate transformations are useful for producing special effects while avoiding the need to directly modify the texture coordinates. One exemplary application of such a transformation is to project a texture onto a terrain surface much the same way that a slide projector projects an image onto a screen surface.

The pixel shader 514 (or fixed function module 512) receives the texture coordinates from the vertex shader 508 (or fixed function module 506), and then proceeds to add the textures to the vertices on the basis of texture coordinates. FIG. 8 provides further details on this process. Namely, FIG. 8 includes a texture addressing module 800 which performs various operations on the basis of input texture coordinates. In one scenario, the texture addressing module 800 performs no operations on the input texture coordinates, and simply passes the texture coordinates to the pixel shader 514. In another scenario, a texture sampler 802 samples texture data 804 on the basis of the input texture coordinates. The resultant texture data 804 extracted in the sampling processing is then forwarded to the pixel shader 514. In another scenario, a modification module 806 is used to modify the input texture coordinates. These modified coordinates can then be forwarded to the texture sampler 802, or forwarded directly to the pixel shader 514.

The texture sampler module 802 can perform a variety of sampling operations. Generally, a texture is composed of a collection of texture elements (referred to as texels). The primitives, however, have already been populated with pixels in the rasterization process. There is generally no one-to-one correspondence between texel data and pixel data, thus requiring the texture sampler 802 to adapt the texel data to surfaces that it is mapped onto. In a nearest-point sampling operation, the sampler module 802 simply retrieves a texel with the closest integer address to an input texture coordinate. In a linear texture filter operation, the texture sampler 802 computes a weighted average of the texels that are immediately above, below, to the left of, and to the right of the nearest sample point in a texture. Still other techniques can be used to sample texel data on the basis of input texture coordinates.

FIG. 9 shows the pixel shader 514 that appears in the processing pipeline 500 discussed above. The pixel shader 514 architecture includes a series of input/output registers (902, 904, 906, 908), and an arithmetic logic unit (ALU) 910 for performing operations on the input data. More specifically, the registers include color registers 902. These registers 902 stream iterated vertex color data from the vertex shader 508 or the fixed function L&T pipeline 506 to pixel shader 514. The constant registers 904 provide user-defined constants to the pixel shader 514. The output/temporary registers 906 provide temporary storage for intermediate calculations. Within this register set, the register r0 also receives an output of the pixel shader 514. The texture registers 908 provide texture data to the pixel shader ALU 910. The pixel shader ALU 910 executes arithmetic and texture addressing instructions.

FIG. 10 illustrates the flow 1000 of operations in the pixel shader ALU 910. As indicated there, the flow includes two parallel pipelines (1002, 1004). The upper pipeline 1002 provides a vector pipeline, which operates on vector data. Vector data is also called color data and contains three channels (RGB) of data. The bottom pipeline 1004 is a scalar pipeline which operates on a single alpha data value. The pipeline is commonly referred to by the data type operated on, so the vector pipeline 1002 is commonly called the color pipe and the scalar pipeline 1004 is commonly called the alpha pipe.

In FIG. 10, the input registers 1006 and 1008 provide input data for the pixel shader 514, e.g., either RGB values for the RGB pipe 1002 or alpha values for the alpha pipe 1004. The component copy module 1010 performs a source register selection function by copying data from one channel into other channels. This is commonly called swizzling. The modify data modules (1012, 1014) modify data read from source registers before an instruction is executed. The execute instruction modules (1016, 1018) are used to perform arithmetic and texture address operations on the pixel data. The modify result modules (1020, 1022) modify the results of the instructions before they are written to an output register. The masking module 1024 controls which components (i.e., R, G, B, A channels) of the destination register are written by the instruction. Finally, at the end of the pipeline, the output register 1026 (e.g., output register r0) stores the output color. In general, the color and alpha pipes (1002, 1004) do not have to execute the same instruction or have the same source registers.

Figure 15:
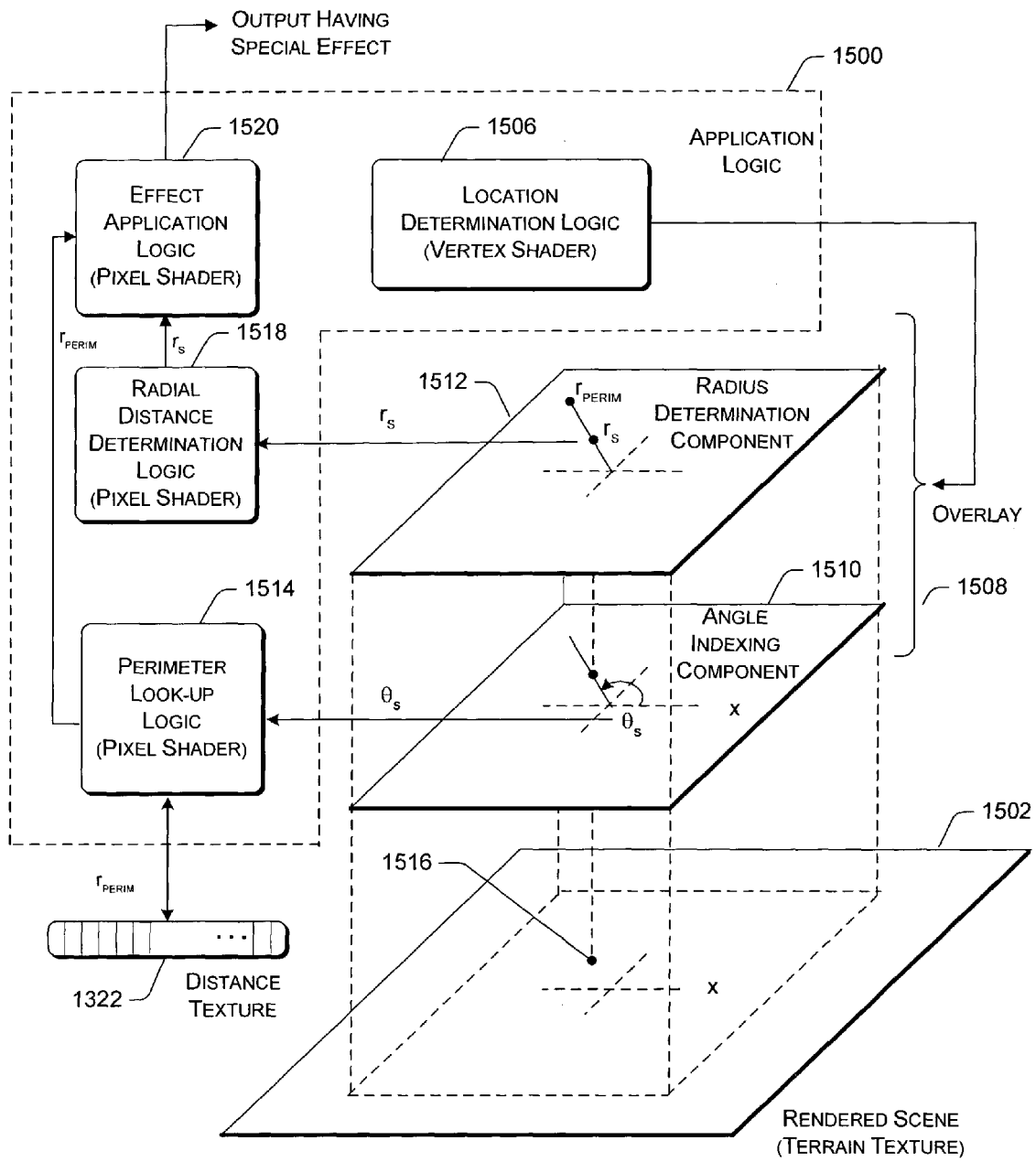
FIG. 15 shows exemplary logic used to apply the object perimeter information to a scene.

The function of the above-indicated modules will become clearer in the context of the discussion of FIG. 15, which provides specific instructions that can be used to apply perimeter information to a scene.

C. PERIMETER GENERATION AND APPLICATION

Figure 11:
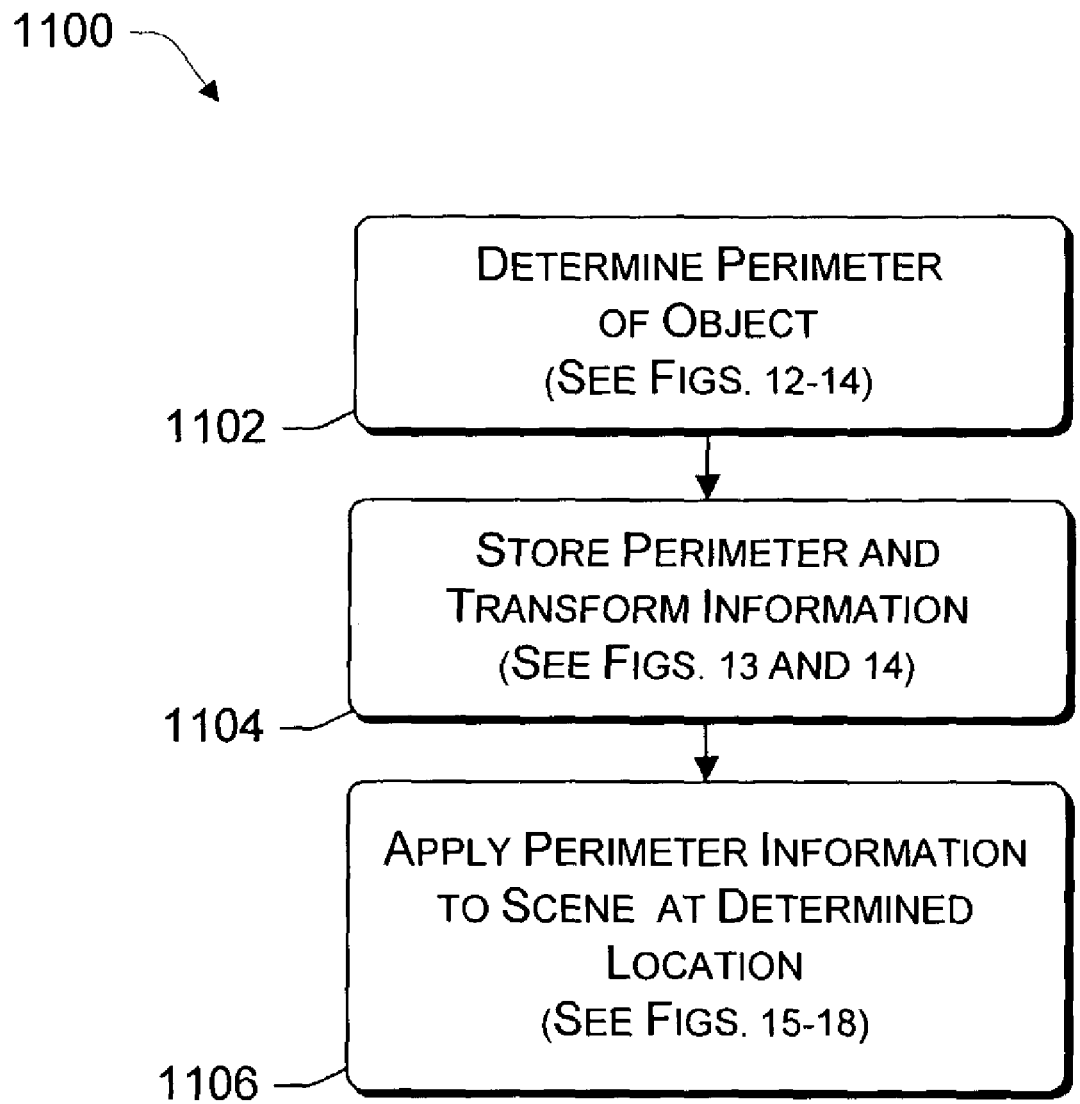
FIG. 11 shows an exemplary overview of a process for generating and applying object perimeter information.
Figure 12:
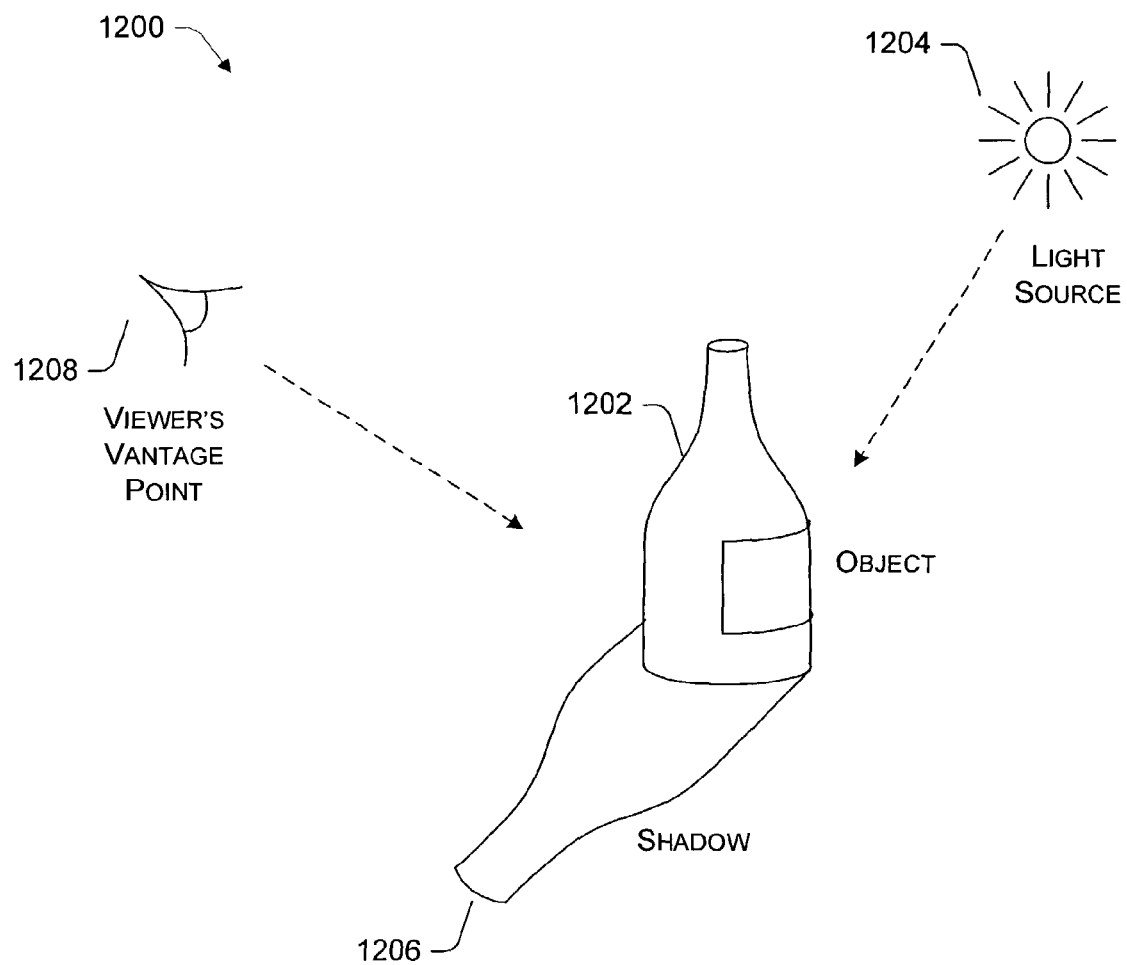
FIG. 12 shows an exemplary environment containing an object and a shadow cast by the object.
Figure 13:
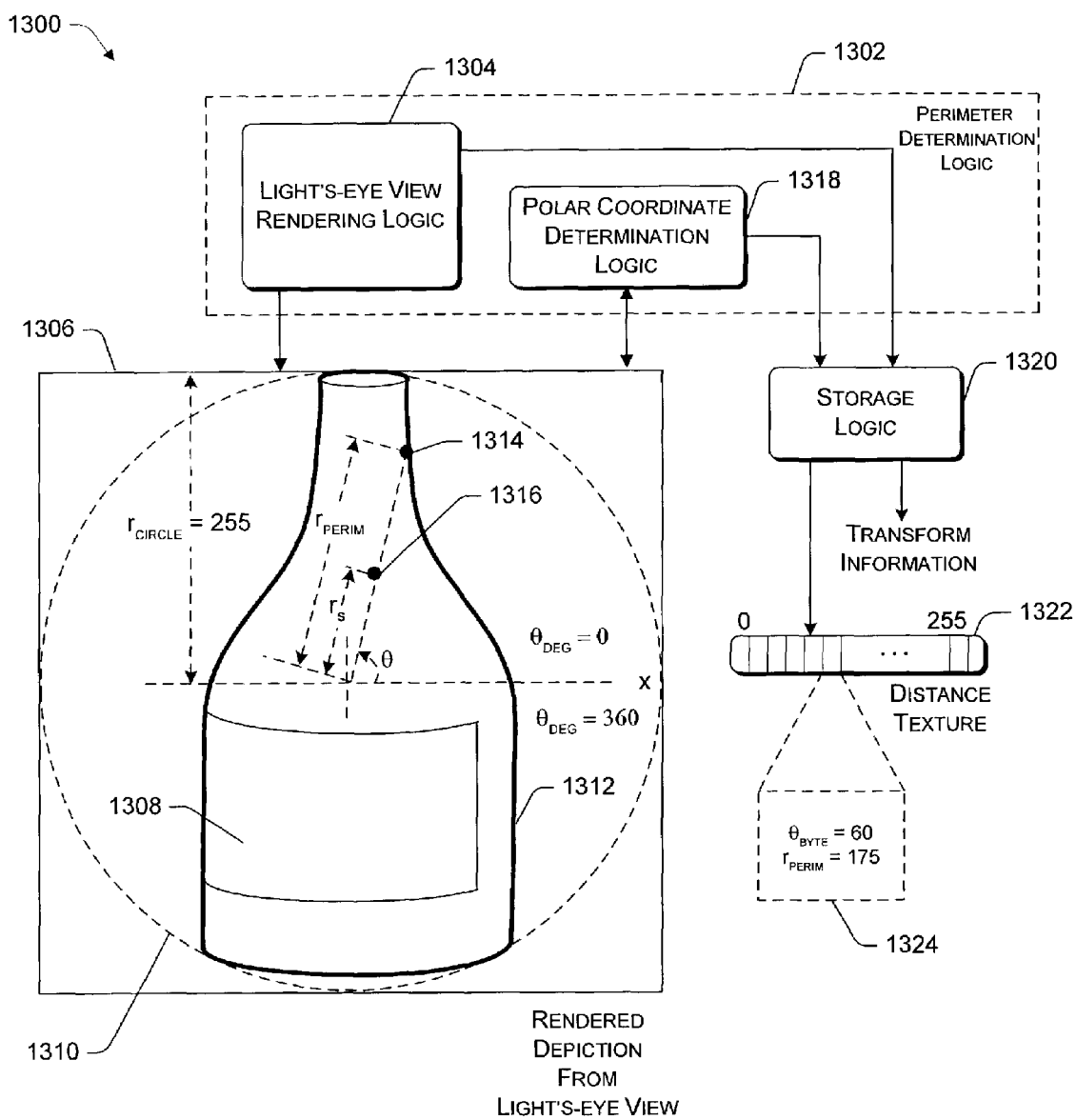
FIG. 13 shows exemplary logic used to generate object perimeter information.
Figure 14:
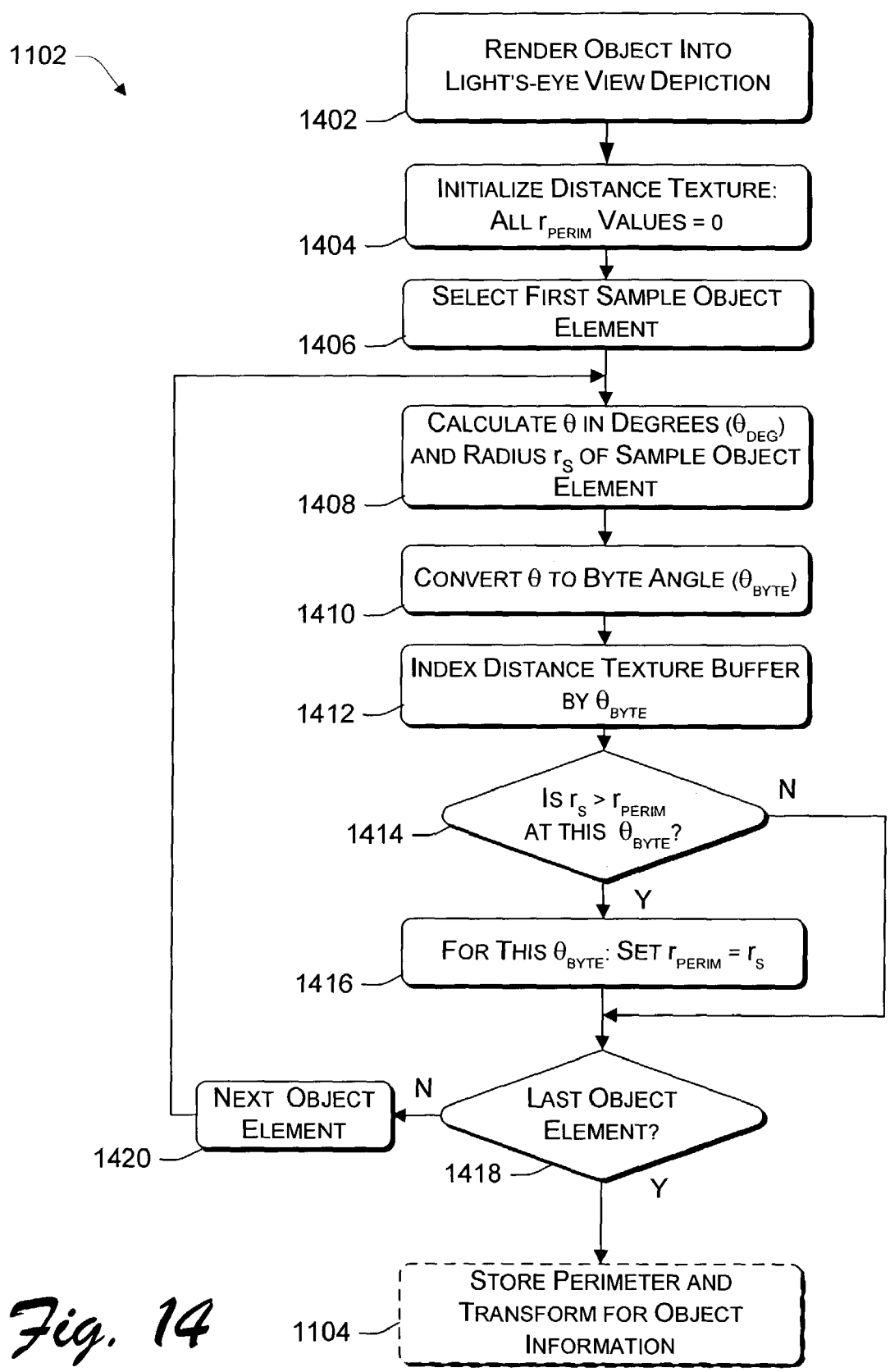
FIG. 14 shows an exemplary method for generating object perimeter information.

FIG. 11 shows a method 1100 which provides an overview of the generation and application of the object perimeter information. In terms of broad steps, the method 1100 includes step 1102 which entails determining a perimeter of an object. FIGS. 12-14 explain this step in further detail. Step 1104 entails storing the perimeter information determined in step 1102, and also storing transform information generated during step 1102. FIGS. 13 and 14 explain this step in further detail. And step 1106 entails applying the perimeter information to a scene at a determined location to provide a graphical effect. An exemplary graphical effect includes the application of a shadow to the scene to simulate a shadow that would be cast by the object. FIGS. 15-18 explain this step in further detail.

In a first implementation, the steps of generating and storing object perimeter information (1102, 1104) are performed "off line" with respect to the subsequent application of the perimeter information to a scene (in step 1106). That is, a designer may opt to generate and store multiple object perimeters corresponding to a variety of objects rendered in the scene. Then, at run time, the processing pipeline 500 retrieves the perimeter information associated with the objects and applies a graphical effect based thereon. A designer may also store different perimeters corresponding to different orientations of a single object with respect to a light source. In this case, the processing pipeline 500 can include logic for identifying and retrieving appropriate perimeters depending on the orientation of objects within the scene.

In a second implementation, a designer may configure the technique such that the object perimeter information is generated (and inherently temporarily stored) at run time, e.g., just prior to it being applied by processing pipeline 500. In this implementation, a designer would not be required to archive object perimeter information for later application in the processing pipeline 500.

In a third implementation, a designer may opt to provide some combination of the first and second techniques described above.

C.1. Determining and Storing an Object Perimeter

FIG. 12 describes an exemplary physical environment 1200 to be simulated in the graphical realm by the processing pipeline 500. The environment 1200 includes an object 1202 (in this exemplary case, a bottle having a curved surface) and a light source 1204. The light source 1204 directs light onto the surface of the object 1202. In doing so, the light 1204 casts a shadow 1206 behind the object 1202. In the proper terminology of shadow rendering, object 1202 is referred to as an occluder. The terrain environment which receives the shadow 1206 is referred to as a receiver. The shadow 1206 includes a penumbra portion, which identifies an outer contour of the shadow 1206, and an umbra portion, which identifies the inner part of the shadow 1206. The goal of a graphical shadow rendering technique is to generate a scene including a shadow that generally resembles the appearance of shadow 1206 in the physical environment 1200.

The processing pipeline 500 renders the scene from an exemplary vantage point of a viewer. This vantage point is referred to below as a "viewer's-eye view" 1208. The viewer's-eye view 1208 corresponds to the camera view 406 located at the pinnacle of the viewing frustum 400 (shown in FIG. 4). According to the exemplary orientation shown in FIG. 12, the user will see the shadow 1206 cast by object 1202 when the scene is rendered.

However, the perimeter of the object is determined by first rendering the object 1202 from the vantage point of the light source 1204. In other words, the processing pipeline 500 renders the scene as if the viewer was looking at the scene from the vantage point of the light source 1204. This vantage point is referred to below as a "light's-eye view." In this orientation, the viewing frustum 400 (shown in FIG. 4) would be defined relative to a camera view 406 positioned at the light source 1204, looking into the scene towards the object 1202. The perimeter of the object 1202 depicted in the light's-eye view corresponds to the contour of the occluding surface which creates the shadow 1206.

FIG. 13 shows exemplary logic 1300 used to generate and store perimeter information. To begin with, the logic 1300 includes perimeter determination logic 1302 for determining perimeter information. The perimeter determination logic 1302, in turn, includes a light's-eye view rendering logic 1304. The light's-eye view rendering logic 1304 renders a scene from the vantage point of the light source 1204 to produce depiction 1306 (referred to below as a "light's-eye view depiction") containing rendered object 1308 (corresponding to object 1202 shown in FIG. 12). As explained above, the light's-eye view rendering logic 1304 generates the light's-eye depiction 1306 by defining the camera view 406 as the position of the light source 1204, and then generating the scene as if it was to be viewed from that vantage point. The rendering of the light's-eye view parallels the processing performed in generating a conventional scene from the viewer's eye view 1208. However, the geometry processing used to produce the light's-eye view uses an orthogonal-type camera. An orthogonal-type camera does not scale the scene for perspective effect. In other words, the light source 1204 is treated as directional, such that there is no foreshortening based on distance from the object 1202.

Note that the view of the rendered object 1308 from the vantage point of the light source 1204 will typically differ from the view of the object 1202 from the vantage point of the viewer. For example, a viewer may see a different portion of the bottle's label than is "visible" in the light's-eye view.

In one exemplary implementation, the processing pipeline 500 renders the light's-eye view depiction 1306 in a 512× 512 8-bit alpha buffer. Further, the processing pipeline 500 renders the light's-eye view depiction 1306 in such a manner that the rendered object 1308 fills the image space provided by the buffer. More specifically, the buffer may be conceptualized to include an inscribed circle 1310. The processing pipeline 500 renders the largest version of rendered object 1308 that it can fit into this inscribed circle 1310.

The rendered object 1308 depicted in the light's-eye view depiction 1306 consists of a plurality of object elements (e.g., texels). A subset of these object elements forms a perimeter 1312 of the rendered object 1308. For instance, one exemplary object element 1314 is located on the perimeter 1312 of the rendered object 1308. A second exemplary object element 1316 is located inside the perimeter 1312 of the rendered object 1308, and hence does not form a part of the perimeter 1312.

Perimeter determination logic 1302 includes polar coordinate determination logic 1318 for determining the respective positions of the object elements which compose the perimeter 1312 in polar representation. More specifically, the polar coordinate determination logic 1318 represents the perimeter 1312 in conventional polar coordinates by specifying the polar r and polar θ values associated with the object elements that compose the perimeter 1312. The polar r value in polar coordinate representation identifies the distance of an object element from a reference origin point located at the center of the inscribed circle 1310. This polar r value also defines a straight line segment which connects the object element with the reference origin point. The polar θ value in polar coordinate representation identifies an angle between an X-axis and the line segment associated with the r value. For instance, consider exemplary object element 1316. This object element 1316 is located at a radial distance $r_s$ from the origin of the inscribed circle 1310. (The notation "$r_s$" denotes that the radial value corresponds to a sample object element currently being processed.) The line segment joining object element 1316 with the origin point defines an angle θ with the X axis. Next consider object element 1314. This object element 1314 is located a radial distance $r_{perim}$ from the origin of the inscribed circle 1310. (The notion "$r_{perim}$" denotes that the object element 1314 is assumed to lie on the perimeter 1312 of the rendered object 1308.) The line segment joining sample object element 1314 and the origin point defines the same angle θ as that associated with object element 1316. As will be discussed further in the context of FIG. 14, by identifying the maximum polar r value for each polar angle value θ, the perimeter determination logic 1302 can compute the perimeter 1312 of the rendered object 1308.

The logic 1300 also includes storage logic 1320 for storing the polar coordinates that define the perimeter 1312 of the rendered object 1308. In one exemplary implementation, a distance texture buffer 1322 is provided for storing the polar coordinates. Each slot in the distance texture buffer 1322 is associated with a different polar angle value. The polar coordinate determination logic 1318 determines a polar r value corresponding to an object element located at a particular polar angle value, and the storage logic 1320 stores this polar r value in a corresponding slot in the distance texture buffer 1322 assigned to this polar angle value. Accordingly, an index of the distance texture buffer 1322 actually represents the polar angle value of the polar coordinates, rather than a separate data item stored in the slots of the distance texture buffer 1322.

In one exemplary implementation, the distance texture buffer 1322 is formed by a 256×1 8-bit alpha buffer. In this implementation, the 0 to 360 degree sweep in conventional polar representation maps into an angle range of 0 to 255 bytes. In other words, the angle in bytes ($\theta_{byte}$) is related to the angle in degrees ($\theta_{deg}$) according to the formula: $\theta_{byte} = \theta_{deg} * (256/360)$. Moreover, the radius of the inscribed circle 1310 is clamped at 255. Thus, no point on the perimeter 1312 can have a polar r value that is greater than 255. Accordingly, the distance texture buffer 1322 stores polar r values in the range of 0 to 255 in storage slots having a polar angle-related index that also ranges from 0 to 255.

For example, FIG. 13 shows a sample entry 1324 stored in distance texture buffer 1322 corresponding to object element 1314 located on the perimeter 1312 of the rendered object 1308. The $\theta_{byte}$ value of this entry 1324 is 60, and the $r_{perim}$ value is 175. This means that the perimeter 1312 at the byte angle of 60 is located at a radial distance of 175 from the origin of the inscribed circle 1310. Again, the distance texture buffer 1322 does not actually store an explicit entry corresponding to the polar byte angle; the polar angle is inferred from the index value of the distance texture buffer 1322.

Finally, the storage logic 1320 also acts to store transform information. The transform information identifies the orientation of the object 1202 relative to the light source 1204, and other geometric information relevant to the rendering of the object 1202 in the light's-eye view. The application logic (to be discussed in FIG. 15) uses this transform information to determine where to apply the perimeter information generated by the perimeter determination logic 1302.

The storage strategy shown in FIG. 13 is a particularly memory-efficient way of representing the perimeter 1312 of the rendered object 1308. For instance, the texture applied in a conventional shadow mapping technique consists of a two dimensional array of distance values, e.g., which may consist of a 640×480 array of texel values. In contrast, as noted above, the distance texture in the present technique uses an efficient 256×1 array of polar r values.

FIG. 14 shows an exemplary method 1102 used to determine object perimeter information (also depicted in broad terms as step 1102 in FIG. 11). The method 1102 includes a first step 1402 of rendering an object into the light's-eye view depiction 1306. The next step 1404 entails initializing the distance texture buffer 1322 so that all of its slots store polar $r_{perim}$ values of 0. The next step 1406 commences the perimeter determination procedure by selecting a first sample object element within light's-eye view depiction 1306. In the next step 1408, the perimeter determination logic 1302 calculates the polar angle value ($\theta_{deg}$) and the polar r value ($r_s$) corresponding to the position of the sample object element within the inscribed circle 1310 (where the subscript "s" indicates that the object element is a sample currently being processed). In step 1410, the perimeter determination logic 1302 converts the determined polar angle value in degrees ($\theta_{deg}$) to a polar angle value in bytes ($\theta_{byte}$). Step 1412 entails using this polar $\theta_{byte}$ value to look up a previously stored polar $r_{perim}$ value stored in a slot in the distance texture buffer 1322 corresponding to the polar $\theta_{byte}$ value. Step 1414 entails comparing the polar $r_s$ value with the stored polar $r_{perim}$ value. Step 1416 entails replacing the stored polar $r_{perim}$ value with the determined polar $r_s$ value if the determined polar $r_s$ value is greater than the previously stored polar $r_{perim}$ value. Steps 1418 and 1420 entail identifying another object element within the light's-eye view depiction 1306, and initiating the above-described processing with respect to this next object element.

In summary, the method 1102 described above iteratively updates the distance texture buffer 1322 with successively larger polar r values encountered in its processing of the light's-eye view depiction 1306. At the end of the processing, the distance texture buffer 1322 should store the largest polar r value at each respective polar angle value, thus defining the perimeter 1312 of the rendered object 1308. Step 1104 (also included in the method 1100 of FIG. 11) entails storing the final perimeter information and transform information upon determination that the last object element within the light's-eye view depiction 1306 has been processed.

Based on the foregoing discussion, it can be seen that the method 1102 is particularly well-adapted for computing perimeter information for objects in which a single non-intersecting line can be drawn from the center of the object to each point on the perimeter of the object. This is implicitly true, for instance, of all convex objects.

C.2. Application of the Perimeter Information

FIG. 15 illustrates application logic 1500 for applying the perimeter information to a scene 1502. The scene 1502 refers to a rendering of the environment shown in FIG. 12 from the viewer's-eye view vantage point 1208, as opposed to the light's-eye view. The scene 1502 may include a depiction of various background objects, terrains, characters, textures, etc. produced by the processing pipeline 500. The application logic 1500 applies a special effect to this scene 1502 based on the stored perimeter information in the manner described below.

To begin with, application logic 1500 includes location determination logic 1506 which determines where to apply the perimeter information within the scene 1502. Different graphical effects may use different strategies for applying the perimeter information to the scene 1502. Accordingly, the specific processing functionality employed by the location determination logic 1506 can vary for different applications. In some implementations, the location determination logic 1506 can determine where to place the special effect prior to the rendering of the scene 1502 (that is, in an "off-line" manner). In other implementations, the location determination logic 1506 can determine where to place the special effect during the rendering of the scene 1502 (that is, in a "real-time" manner). In still other implementations, the location determination logic 1506 can determine where to place the special effect using both off-line computations and real-time computations. Thus, the location determination logic 1506 loosely represents any functionality for determining the placement of the special effect on the scene 1502, and may include different modules that operate at different times.

For instance, consider the use of the perimeter information to generate shadows in the scene 1502. A variety of techniques for projecting shadows can be used to determine where to place the shadow within the scene 1502. In broad terms, the location determination logic 1506 can determine where to place the shadow by effectively projecting the shadow across the scene terrain in a manner analogous to the projection of a slide on a screen using a slide projector. More specifically, the shadow will be drawn on portions of the scene terrain which intersect the projected shadow. These portions will lie "behind" the object 1202 (that is, relative to the fictitious light source 1204). And as described above, these computations can be performed off-line and/or in real-time depending on the particular graphical application. In any case, the output of the location determination logic 1506 is a set of texture coordinates which determines where to place the shadow in the rendered scene 1502—that is, where to apply the perimeter information.

While a number of different strategies can be used to compute the texture coordinates, details regarding one exemplary technique are provided below. In this exemplary technique, the location determination logic 1506 can determine the complete set of terrain triangles in the scene 1502 that will intersect with the shadow when it is projected onto the terrain. This can be performed using a well-known process called frustum culling. In this process, the location determination logic 1506 determines a frustum box having a front clipping plane positioned directly in front of the occluding object 1202, and a rear clipping plane ending where the shadow is set to end (which can be defined based on the designer's preference to provide a realistic looking shadow). The X and Y dimensions of the frustum box are selected to be large enough to encompass the occluding object 1202 (e.g., in a manner similar to that shown in FIG. 13). Terrain located within this resultant frustum box will likely receive the shadow when the scene 1502 is rendered. These calculations can be performed in an off-line manner and/or in a real-time manner.

In one exemplary implementation, the actual computation of the texture coordinates can use the following equations:

$$V_{ls} = \text{INVERSE\_LIGHT\_TRANSFORM} * V_{ws} \quad (1)$$

$$V_{ts} = V_{ls} * <(0.5/\text{RADIUS}), -(0.5/\text{RADIUS}), 1> + <0.5, 0.5, 0.0>. \quad (2)$$

In question (1), the vector "$V_{ws}$" refers to a vertex position in world space, and the vector "$V_{ls}$" refers to a vertex position in light space. Light space, in turn, refers to a representation of the vertex position from the vantage point of the light source 1204. "INVERSE_LIGHT_TRANSFORM" refers to a matrix transform that can convert $V_{ws}$ into $V_{ls}$, and is determined on the basis of the transform information collected during the formation of the perimeter information. Thus, in summary, equation (1) transforms vertices in world space to vertices in light space using previously stored transform information. (Although not expressly identified above, the computation of $V_{ls}$ values may also involve making well-known projection space transformations.)

In equation (2), "RADIUS" refers to the radius of the inscribed circle 1310 shown in FIG. 13. Vector "$V_{ts}$" refers to the vertex position in texture space, which, in turn, provides the texture coordinates that determine the placement of the shadow onto the terrain in scene 1502. More specifically, the second equation scales and offsets the vertices in light space such that they are in the conventional texture format, e.g., where 0,0 is located in the upper left-hand corner of the space, and 1,1 is located in the lower right-hand corner of the space. The output of the second equation thus defines the U, V texture coordinates which determine where to apply the object perimeter information in the scene 1502. In one implementation, the vertex shader 508 can be used to execute equation (2) during the rendering of the scene 1502.

Next, the application logic 1500 is configured to place an overlay 1508 over the scene 1502 at a location determined by the location determination logic 1506 (e.g., based on the texture coordinates generated by the location determination logic 1506). This operation is implemented in the pixel shader 514 (as well as all subsequent operations described with reference to FIG. 15). The overlay 1508 includes two components: a first component 1510 used to identify a polar angle value for performing a look-up operation in the distance texture buffer 1322, and a second component 1512 used to determine a polar r value associated with a sample object element within the scene 1502. The first component is referred to as an angle indexing component 1510. The second component is referred to as a radius determination component 1512.

Figure 16:
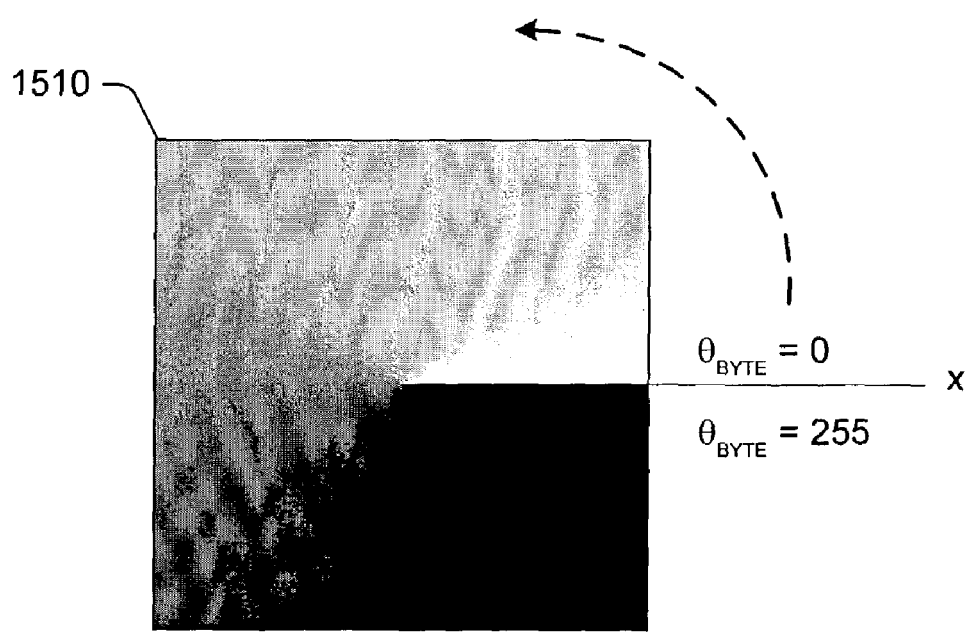
FIG. 16 shows an angle indexing component of an overlay texture.

Jumping ahead briefly in the sequence of figures, FIG. 16 provides an exemplary graphical depiction of the values stored in the angle indexing component 1510. This angle indexing component 1510 includes a circular sweep of polar angle values ranging from 0 to 255. That is, the angle indexing component 1510 includes a plurality of rays that extend from a center of the angle indexing component 1510 out to the edge of the angle indexing component 1510. Each ray is populated with texels having the same value, where that same value corresponds to the polar angle value that the ray makes with respect to the X axis. Accordingly, for example, a ray that extends at 90 degrees is populated with values that correspond to this byte angle, namely $\theta_{byte}=90*(256/360)$. Accordingly, it is possible to determine the angular location of any point in the angle indexing component 1510 simply by reading the value stored at this point, as this value identifies its angular position in the component 1510. In one exemplary implementation, the alpha channel can be used to implement the angle indexing component 1510.

Figure 17:
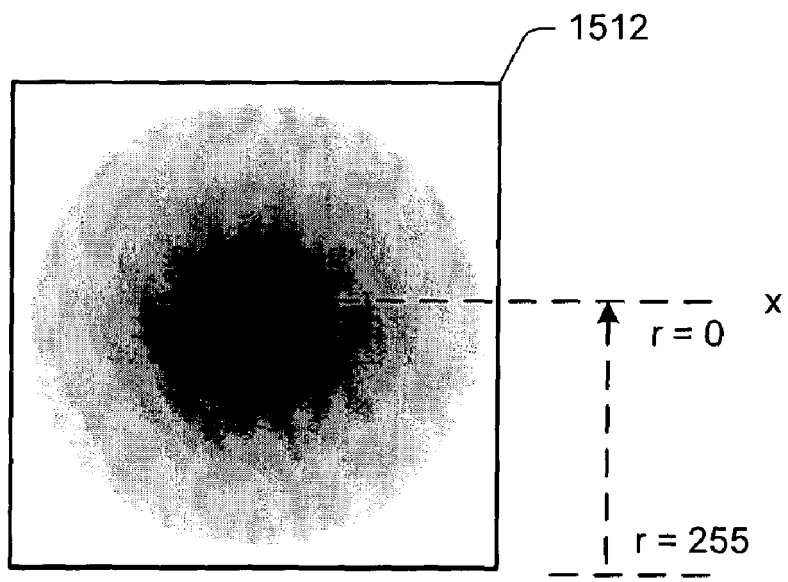
FIG. 17 shows a radius determination component of the overlay texture.

FIG. 17 provides an exemplary graphical depiction of the values stored in the radius determination component 1512. The radius determination component 1512 provides a linear radial gradient that gives the respective distances, in texels, from a center of the radius determination component 1512 to each texel in the component 1512. That is, in the radius determination component 1512, each ray has polar r values that range from 0 to 255. Accordingly, it is possible to determine the polar r value of any texel in the radius determination component 1512 simply by reading the value stored at this texel, as this value corresponds to the distance between this texel and the center of the component 1512. In one exemplary implementation, the red, blue, and green (RGB) channels can be used to each store a complete version of the radius determination component 1512. More specifically, the pixel shader 514 can distribute the values that populate the radius determination component 1512 to each of the red, blue, and green channels through the process of swizzling discussed in the context of FIG. 10. (Note that the duplication of the radius determination component 1512 into three separate channels does not represent a significant feature in terms of the theoretical underpinnings of the technique; the duplication of the channels is a byproduct of the exemplary implementation of the perimeter processing technique using the pixel shader tools discussed with reference to FIGS. 9 and 10.)

Returning to FIG. 15, look-up logic 1514 applies the angle indexing component 1510 of the overlay 1508 to the scene 1502 to determine the polar angle that a sample object element 1516 within the scene 1502 makes with respect to a reference X axis. This function is performed by identifying a texel in the angle indexing component 1510 that is aligned with the location of the sample object element 1516, and then reading the value of this texel. The read value corresponds to the polar angle of the sample object element's position (with respect to the reference X axis), which is denoted as $\theta_s$. The polar angle value $\theta_s$ lies within the clamped range of 0 to 255. The look-up logic 1514 then uses this determined polar angle value $\theta_s$ as an index to retrieve a polar perimeter value ($r_{perim}$) stored at a slot in the distance texture buffer 1322 corresponding to the determined polar angle value $\theta_s$. By repeating this procedure for a plurality of sample object elements, the pixel shader 514 functions to "unpack" the perimeter information stored in the distance texture buffer 1322 using the overlay 1508 as an indexing mechanism.

Radial determination logic 1518 next comes into play by determining the polar r value of the sample object element 1516. This polar r value reflects the distance between the sample object element 1316 and a reference origin point. To determine the polar r value, the radial determination logic 1518 identifies a texel within the radius determination component 1512 that is aligned with the sample object element 1316, and then reads the value stored at this texel location. The value stored at this texel location corresponds to the distance between object element 1516 and the reference center point, and is denoted as $r_s$.

Effect application logic 1520 receives the results of the look-up logic 1514 (namely, the polar $r_{perim}$ values defining the perimeter of the object) and the radial determination logic 1518 (namely, the polar $r_s$ values associated with object elements under consideration within the scene 1502). The effect application logic 1520 uses these results to provide a desired graphical effect. In one example, the effect application logic 1520 renders a shadow onto the scene 1502 based on these values. This task can be performed by determining whether each polar $r_s$ value indicates that the associated object element lies inside or outside of the object perimeter. This, in turn, can be used to generate a shadow for the object.

More specifically, recall that the object perimeter information was generated from the vantage point of the light source 1204, so the projection of this perimeter onto the scene 1502 simulates the object's shadow (because the contours of the rendered object 1308 in this orientation define the edges of the occluding shape, which also generally matches the shape of the shadow projected on the receiver). An object element inside the perimeter lies inside the object's shadow. An object outside the perimeter lies outside of the object's shadow. The effect application logic 1520 can provide coloring (e.g., shading) to the scene 1502 on the basis of whether the object elements are positioned inside or outside of the shadow.

Further, a comparison of the polar $r_s$ value with the polar $r_{perim}$ value also provides an indication of how close an object element is with respect to the perimeter of the object. For instance, the difference between the polar $r_s$ value and the polar $r_{perim}$ value reflects how close an object element is with respect to the perimeter. The effect application logic 1520 can use this information to selectively color (e.g., shade) the scene 1202 based on the proximity of the object element to the perimeter. For instance, the effect application logic 1520 can reduce the darkness of the shadow as it advances towards its penumbra (edge) of the shadow. This produces a shadow having a soft (tapered) edge, which is generally more realistic and visually appealing than a shadow with an abrupt "hard" edge.

As mentioned above, the pixel shader 514 can be used to execute the look-up logic 1514, the radial determination logic 1518, and the effect application logic 1520. The following discussion provides additional details pertaining to this pixel shader implementation.

To begin with, the overlay 1508 can be assigned to texture register t0 of the pixel shader 514 (illustrated in FIG. 9). The distance texture can be assigned to the texture register t1 of the pixel shader 514. A first series of pixel shader instructions is as follows:

text0 (3)

textreg2art1,t0. (4)

The third instruction loads the texture register t0 with color data (RGBA) sampled from the overlay texture 1508. The fourth instruction interprets the alpha and red color components of the texture register t0 as texture address data (U, V) for use in sampling the distance texture data assigned to texture register t1, and returns the results of this sampling operation to texture register t1. In effect, the fourth instruction performs the function associated with the look-up logic 1514 shown in FIG. 15. Namely, the fourth instruction retrieves a polar angle value from the alpha channel of register t0 and uses this as a U-coordinate look-up into the distance texture buffer 1322, returning a polar perimeter value ($r_{perim}$) stored at that polar angle value. In performing this operation, the polar angle value retrieved from register t0 (which may range from 0 to 255) is scaled to the typical U-value range of 0.0 to 1.0. Because the distance texture buffer is a one-dimensional array of values (e.g., 256×1), the V coordinate supplied by the texreg2ar instruction (corresponding to the R channel of the color data) does not assist in executing the look-up operation, and thus, in this specific application, represents a superfluous feature of the texreg2ar instruction. More specifically, the values stored in the RGB channels are used to directly supply values to the effect application logic 1514 (to be described below), and are not being used as look-up indices.

The pixel shader 514 next performs the following series of instructions:

$$\text{sub\_x4 r0,t0,t1.a} \tag{5}$$

$$\text{mov\_x2 r0,r0\_sat} \tag{6}$$

$$\text{mov\_x2 r0,r0} \tag{7}$$

$$\text{addr0,r0,v0} \tag{8}$$

In the fifth instruction, the term "t1.a" swizzles (copies) the contents of the alpha channel into the RGB channels of texture register t1. By virtue of this operation, the RGB channels of the texture register t1 should contain the polar $r_{perim}$ value at a particular polar angle value (because this information was obtained in the fourth instruction and stored in the texture register t1). The texture register t0 term in the fifth instruction identifies the polar $r_s$ distance between an object element under consideration and a reference center point, obtained via the RBG channels of texture register t0 (representing the contribution of the radius determination component 1512 of the overlay 1508). The fifth instruction therefore effectively subtracts the polar $r_s$ value from the polar $r_{perim}$ value. The resultant difference provides an indication of whether the object element under consideration lies inside or outside of the perimeter, and also provides an indication of how close the object element under consideration is to the perimeter (by virtue of the magnitude of the difference between the polar $r_s$ value and the polar $r_{perim}$ value). The results of this subtraction operation are stored in the output register r0. The modifier "_x4" that modifies the subtraction instruction serves to multiply the difference value by a factor of 4 before it is stored in the output register r0.

The sixth instruction multiplies the contents of the output register r0 (containing the scaled difference value discussed above) by a factor of two, and then stores the result back into the output register r0. The saturation modifier ("sat") clamps the contents of the output register r0 into the range of 0.0 to 1 before performing the multiplication operation.

The seventh instruction again retrieves the value stored in the output register r0, multiplies it by a factor of 2, and then stores the results back into the output register r0. The combined effect of the multiplication operations performed in the fifth through seventh instructions is to multiply the difference value formed in the fifth instruction by a factor of 16 (e.g., 4×2×2=16). This operation helps to smooth out the rendered shadow by reducing abrupt transitions from shadowed regions to non-shadowed regions. That is, the difference values calculated using the fifth equation may range from a minimum value (e.g., 0) to a maximum value (e.g., 255). This maximum value is reached more quickly by scaling the difference values in the manner described above. This, in turn, smoothes the resultant shadow by ensuring that the difference values are evenly tapered, rather than abruptly terminating at the edges of the shadow (without reaching the maximum value).

Finally, the sixth instruction adds the result in the output register r0 (reflecting the accumulated operations performed in the third through fifth instructions) with a color value stored in the color register v0, and stores this sum back into output register r0. The sixth instruction serves to color the shadow so that it is not completely black.

A number of supplemental strategies can be used to enhance the realism of the shadows. In one strategy, the shadow can be faded out depending on the orientation of the terrain with respect to the light source. In this manner, the shadow can be increasingly faded as the terrain becomes progressively angled away from the light source. This will have the effect of reducing the contribution of so-called "long shadows," such as graphical shadows that are analogous to shadows cast at sunset by a light source that is relatively low in the sky. This effect can be produced on a vertex-by-vertex basis by calculating a fading amount that is based on the normal of a vertex, and also the normalized direction from that vertex to the light source (e.g., based on the dot product of these values).

In another strategy, the shadow can be faded based on its distance from the occluding object. This will also have the effect of reducing the contribution of so-called "long shadows"—in this case by reducing the contribution of the shadow as a function of its distance from the occluding object. This effect can be produced using a number of different techniques. In one technique, a fadeout texture can be defined which fades from a maximum value (providing the greatest amount of fading) to a minimum value (providing the least amount of fading). This fadeout texture can be applied to the shadow to fade the shadow as a function of the shadow's distance from the occluding object. More specifically, in one implementation, the fadeout texture forms a horizontal gradient having 256×1 pixels, storing values that range from the minimum value to the maximum value. A value is selected from the fadeout texture based on the z-distance value between a sample point in the shadow and an origin point (e.g., the z-position of the occluding object). The value retrieved from the fadeout texture determines the degree of fading to be applied to the shadow at that particular sample point. To facilitate this functionality, texture coordinates can be defined within the shadowed regions which respectively reflect z-distance values, and which thus appropriately map into the fadeout texture.

Still other techniques can be used to enhance the realism of the shadows.

Figure 18:
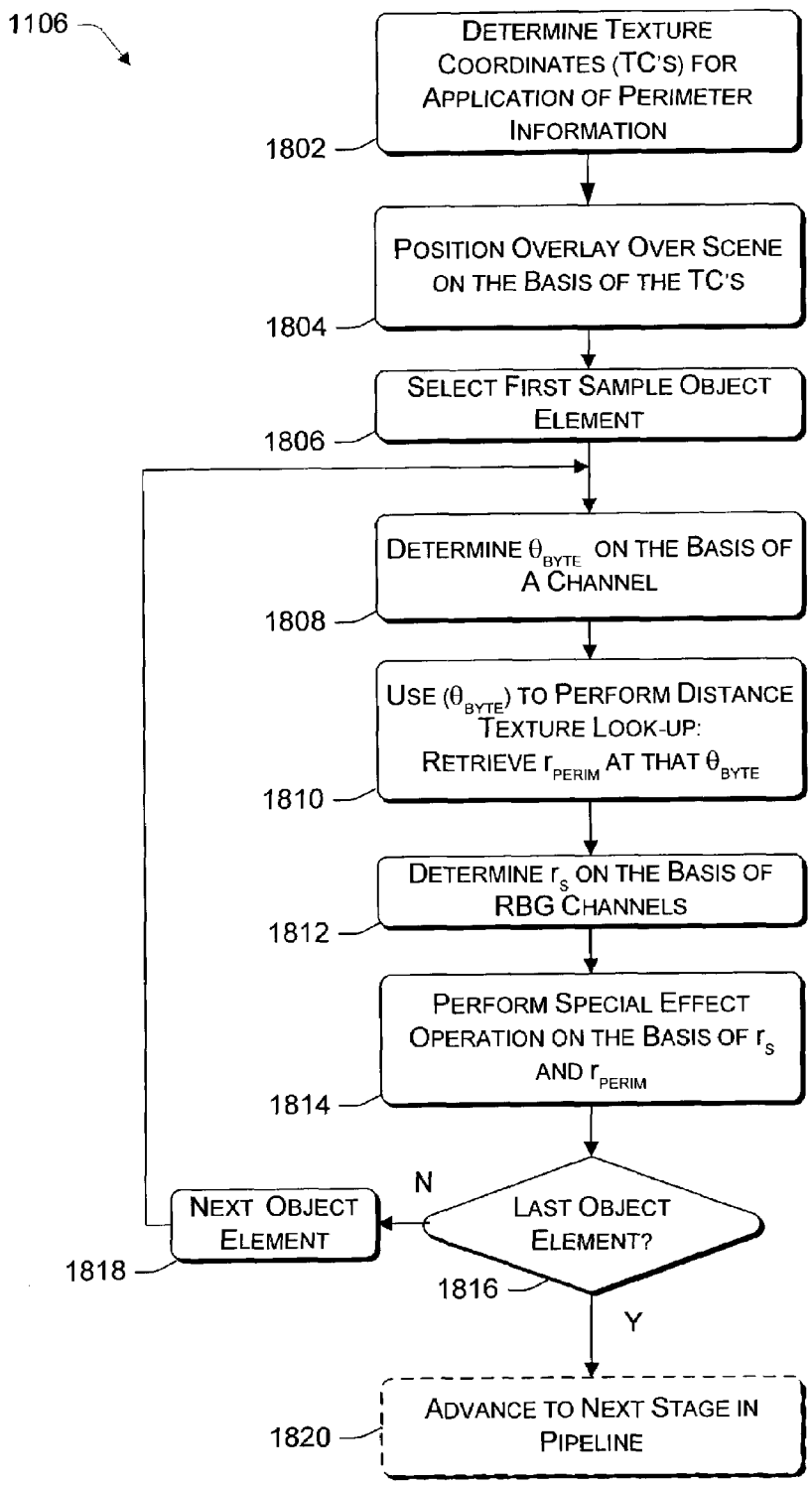
FIG. 18 shows an exemplary method for applying object perimeter information to a scene.

FIG. 18 presents an exemplary method 1106 for applying the perimeter information to the scene 1504 at a determined location to provide a graphical effect, which serves as a summary of the explanation provided above with respect to FIGS. 15-17. (Also note that the exemplary method 1106 is included as a broad step within the method 1100 of FIG. 11).

In step 1802, the application logic 1500 determines texture coordinates that determine the location at which to apply the perimeter information. This can be performed by transforming texture coordinates in the manner described above. Step 1804 entails positioning the two-component overlay 1508 over the scene 1502 at the location identified in step 1802. Step 1806 commences the analysis by identifying a first object element for processing (typically corresponding to a texel within the scene). Step 1808 entails determining the polar $\theta_{byte}$ angle value associated with the object element using the angle indexing component 1510 of the overlay 1508 (corresponding to the alpha channel of the overlay 1508). The look up logic 1514 performs this task. Step 1810 entails using the determined $\theta_{byte}$ as an index to retrieve a polar perimeter value $r_{perim}$ from the distance texture buffer 1322. This operation is also performed by the look up logic 1514. Step 1812 entails using the radius determination component 1512 of the overlay 1508 to determine the polar $r_s$ value, which reflects the distance between the object element under consideration and a reference center point. This function is performed by the radial determination logic 1518. Finally, step 1814 entails providing a graphical effect on the basis of the polar $r_{perim}$ value and the polar $r_s$ value retrieved from the look-up logic 1514 and the radial determination logic 1518, respectively. This function is performed by the effect application logic 1520. The graphical effect may constitute subtracting the polar $r_s$ value from the polar $r_{perim}$ value. Steps 1816 and 1818 serve to identify another object element to receive the same processing discussed above. When the pixel shader of the application logic 1500 has processed all of the object elements, the processing advances to the next stage in the processing pipeline 500 (as indicated by step 1820).

D. CONCLUSION

The disclosed techniques perform packing and unpacking object perimeter information in an efficient manner by storing polar perimeter information in reduced memory space, by unpacking the polar perimeter information using a texture overlay, and by applying the unpacked perimeter information to a scene.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus for generating object perimeter information and applying the object perimeter information to provide a graphical effect, comprising:
    perimeter determination logic configured to determine a polar representation of the perimeter of an object to define polar perimeter information;
    storage logic configured to store the polar perimeter information; and
    application logic configured to apply the polar perimeter information to provide the graphical effect within a scene, wherein the applying logic further comprises:
        location determination logic configured to determine a location to apply the polar perimeter information within a scene,
        wherein the application logic is further configured to apply the polar perimeter information at the determined location within the scene,
    wherein the perimeter determination logic and storage logic are configured to produce the polar perimeter information of the object independently of the scene in which the object appears.

2. An apparatus according to claim 1, wherein the perimeter determination logic further comprises:
    rendering logic configured to render a depiction of the object from a vantage point, wherein the depiction of the object includes a plurality of object elements, and wherein a subset of the object elements forms the perimeter of the object; and
    polar coordination determination logic configured to ascertain polar coordinates defining respective positions of the object elements that form the perimeter of the object.

3. An apparatus according to claim 2, wherein the rendering logic is further configured to form the depiction of the object from the vantage point of a light source.

4. An apparatus according to claim 2, wherein the polar coordinate determination logic is further configured to:
    identify a sample object element;
    determine a polar angle value associated with a position of the sample object element within the depiction of the object;
    determine a polar radius value associated with the position of the sample object element within the depiction of the object;
    compare the determined polar radius value with a previously stored polar perimeter radius value associated with the determined polar angle value;
    replace the previously stored polar perimeter radius value with the determined polar radius value if the determined polar radius value is greater than the previously stored polar perimeter radius value; and
    successively repeat the operations of identifying through replacing for additional sample elements within the depiction.

5. An apparatus according to claim 2, wherein the storage logic is further configured to store the polar coordinates of the object elements that form the perimeter of the object.

6. An apparatus according to claim 5, further comprising:
    a storage device having storage slots associated with respective polar angle values,
    wherein the storage logic is configured to store the polar perimeter radius values in respective storage slots of the storage device.

7. An apparatus according to claim 2, wherein the storage logic is further configured to store transform information that reflects an orientation of the object with respect to the vantage point.

8. An apparatus according to claim 2, wherein the rendered depiction comprises a two dimensional collection of object elements.

9. An apparatus according to claim 1, wherein the location determination logic is configured to determine texture coordinates that define where to apply the polar perimeter information within the scene.

10. An apparatus according to claim 9, wherein the location determination logic is further configured to:
    identify transform information that represents an orientation of the object with respect to a light source vantage point; and
    generate the texture coordinates on the basis of the transform information.

11. An apparatus according to claim 1, wherein the application logic is further configured to:
    place an overlay on top of the scene at the determined location; and
    retrieve the polar perimeter information using the overlay.

12. An apparatus according to claim 11, wherein the overlay includes a polar angle indexing component, and wherein the application logic further includes look-up logic configured to use the polar angle indexing component to retrieve stored polar perimeter radius values associated with respective polar angle values identified by the angle indexing component.

13. An apparatus according to claim 12, wherein the overlay includes a radius determination component, and wherein the application logic further includes radial determination logic configured to use the radius determination component to determine polar radius values within the scene, the polar radius values defining respective distances between points in the scene and a reference center point.

14. An apparatus according to claim 13, wherein the application logic further includes effect application logic configured to use the retrieved polar perimeter radius values and the determined polar radius values to apply a shadow to the scene, wherein the applied shadow is representative of a shadow cast by the object.

15. An apparatus according to claim 1, wherein the application logic further includes effect application logic configured to use the polar perimeter information to apply a shadow to the scene, wherein the applied shadow is representative of a shadow cast by the object.

16. A computer-readable medium having computer-executable instructions for implementing each of the logic recited in claim 1.

17. An apparatus according to claim 1, wherein the scene comprises a two dimensional rendering of an environment that includes the object, and wherein the application logic is configured to project the polar perimeter information onto the scene at the determined location.

18. An apparatus according to claim 1, wherein the application logic is configured to produce the graphical effect without computing a volume cast by the perimeter information.

* * * * *